United States Patent
Xing et al.

(10) Patent No.: US 12,429,868 B2
(45) Date of Patent: Sep. 30, 2025

(54) METHOD AND DEVICE FOR DETERMINING MOTION PARAMETER OF AUTONOMOUS MOBILE DEVICE

(71) Applicant: Qfeeltech (Beijing) Co., Ltd., Beijing (CN)

(72) Inventors: Xingguo Xing, Beijing (CN); Rui Zhu, Beijing (CN); Minsheng Wu, Beijing (CN); Xin Wu, Beijing (CN)

(73) Assignee: QFEELTECH (BEIJING) CO., LTD., Beijing (CN)

( * ) Notice: Subject to any disclaimer, the term of this patent is extended or adjusted under 35 U.S.C. 154(b) by 287 days.

(21) Appl. No.: 18/215,817

(22) Filed: Jun. 28, 2023

(65) Prior Publication Data
US 2023/0341853 A1  Oct. 26, 2023

Related U.S. Application Data

(63) Continuation of application No. PCT/CN2021/130645, filed on Nov. 15, 2021.

(30) Foreign Application Priority Data

Dec. 30, 2020  (CN) .......................... 202011628057.8

(51) Int. Cl.
*G05D 1/00* (2024.01)
*G06T 7/246* (2017.01)

(52) U.S. Cl.
CPC ......... *G05D 1/0055* (2013.01); *G05D 1/0238* (2013.01); *G05D 1/0253* (2013.01); *G06T 7/246* (2017.01); *G06T 2207/30252* (2013.01)

(58) Field of Classification Search
None
See application file for complete search history.

(56) References Cited

U.S. PATENT DOCUMENTS 11,199,853 B1 * 12/2021 Afrouzi ................. B25J 13/006
12,329,350 B2 *  6/2025 Finnegan .............. A47L 9/2852
(Continued)

FOREIGN PATENT DOCUMENTS

CN       108961342 A    12/2018
CN       108983254 A    12/2018
(Continued)

OTHER PUBLICATIONS

Chhaniyara Savan et al: "Optical Flow Algorithm for Velocity Estimation of Ground Vehicles: A Feasibility Study", International Journal On Smart Sensing and Intelligent Systems, vol. 1, No. 1, Jan. 1, 2008 (Jan. 1, 2008), NZ, pp. 245-267, XP093214938, ISSN: 1178-5608, DOI: 10.21307/ijssis-2017 (Year: 2017).*

(Continued)

*Primary Examiner* — Nancy Bitar
(74) *Attorney, Agent, or Firm* — MILLBURN IP PLLC

(57) ABSTRACT

The present disclosure provides a method and a device for determining a motion parameter of an autonomous mobile device. The method includes: an anti-fall sensor detects a current chassis-floor distance between a chassis of the autonomous mobile device and a current floor, and transmits the current chassis-floor distance to a processor; the processor determines a correction coefficient corresponding to the current chassis-floor distance; the processor obtains an output of an optic flow sensor; the processor determines the motion parameter corresponding to the current chassis-floor distance based on a correction coefficient, a calibration coefficient, and the output of the optic flow sensor, which increases the accuracy of the motion parameter obtained through computation.

12 Claims, 16 Drawing Sheets

(56) References Cited

U.S. PATENT DOCUMENTS

| | | |
|---|---|---|
| 2010/0302158 A1 | 12/2010 | Fang et al. |
| 2016/0103451 A1 | 4/2016 | Vicenti |
| 2016/0144511 A1 | 5/2016 | Romanov et al. |
| 2020/0103899 A1 | 4/2020 | Zhu et al. |

FOREIGN PATENT DOCUMENTS

| | | | |
|---|---|---|---|
| CN | 109506652 A | 3/2019 | |
| CN | 109814555 A | 5/2019 | |
| CN | 111044080 A | 4/2020 | |
| CN | 111796290 A | 10/2020 | |
| CN | 112783170 A | 5/2021 | |
| EP | 3009789 A1 | 4/2016 | |
| WO | 2014199929 A1 | 12/2014 | |
| WO | WO-2020207173 A1 * | 10/2020 | ............. G01S 15/88 |

OTHER PUBLICATIONS

Extended European Search Report dated Oct. 30, 2024, issued in European Patent Application No. 21913525.8, filed on Jul. 17, 2023 (10 pages).

Chhaniyara S., et al., "Optical Flow Algorithm for Velocity Estimation of Ground Vehicles: A Feasibility Study," International Journal on Smart Sensing and Intelligent Systems, vol. 1, No. 1, Jan. 1, 2008, pp. 245-267 (23 pages).

First Office Action issued on Jun. 29, 2023, in Chinese Patent Application No. 202011628057.8, filed on Dec. 30, 2020, and English machine translation (12 pages).

International Search Report and Written Opinion issued on Jan. 25, 2022, in PCT/CN2021/130645, filed on Nov. 15, 2021, and English machine translation (17 pages).

* cited by examiner

METHOD AND DEVICE FOR DETERMINING MOTION PARAMETER OF AUTONOMOUS MOBILE DEVICE

CROSS-REFERENCE TO RELATED APPLICATIONS

This application is a continuation of International Application No. PCT/CN2021/130645, filed on Nov. 15, 2021, which claims priority to Chinese Patent Application No. 202011628057.8, filed in Chinese Patent Office on Dec. 30, 2020, titled "Method and Device for Determining Motion Parameter of Autonomous Mobile Device." The entire content of the above-referenced applications is incorporated herein by reference in this application.

TECHNICAL FIELD

The present disclosure relates to the technical field of robots, and particularly, to a method and a device for determining a motion parameter of an autonomous mobile device.

BACKGROUND

Motion parameters such as velocity and displacement may be used for dead reckoning, thereby realizing localization of an autonomous mobile device. The above motion parameters are obtained through computation based on an output from an optic flow sensor.

In current technology, an optic flow sensor is fixedly installed on an autonomous mobile device. After the autonomous mobile device obtains the output from the optic flow sensor, the autonomous mobile device can directly compute the motion parameters based on the output using corresponding formulas. However, when the autonomous mobile device moves on the floor of a work zone, the material of the floor in the work zone may change. For example, at a preceding second the autonomous mobile device may be moving on a hard floor, and at the next second the autonomous mobile device may move to a soft carpet, which can cause the motion parameters computed using the above method to be inaccurate.

SUMMARY OF DISCLOSURE

The present disclosure provides a method and a device for determining a motion parameter of an autonomous mobile device, in order to increase the accuracy of the motion parameter obtained through computation.

In a first aspect, the present disclosure provides a method for determining a motion parameter, which is implemented in an autonomous mobile device. The autonomous mobile device includes an optic flow sensor, an anti-fall sensor, a motion device, and a processor. The method includes:
  detecting, by the anti-fall sensor, a current chassis-floor distance between a chassis of the autonomous mobile device and a current floor, and transmitting the current chassis-floor distance to the processor;
  determining, by the processor, a correction coefficient corresponding to the current chassis-floor distance; obtaining, by the processor, an output of the optic flow sensor; determining, by the processor, a motion parameter corresponding to the current chassis-floor distance based on the correction coefficient, a calibration coefficient, and the output of the optic flow sensor;
  wherein the calibration coefficient is, when the autonomous mobile device moves at a calibrated chassis-floor distance, a correspondence relationship between an output of the optic flow sensor and an actual motion parameter; wherein the correction coefficient is used to correct the calibration coefficient when the current chassis-floor distance is different from the calibrated chassis-floor distance, to obtain the motion parameter corresponding to the current chassis-floor distance; wherein the motion parameter including at least one of a displacement or a velocity.

In some embodiments, wherein determining, by the processor, the correction coefficient corresponding to the current chassis-floor distance; determining, by the processor, the motion parameter corresponding to the current chassis-floor distance based on the correction coefficient, the calibration coefficient, and the output of the optic flow sensor, includes:
  multiplying, by the processor, the correction coefficient, the output of the optic flow sensor, and the calibration coefficient, to obtain the motion parameter corresponding to the current chassis-floor distance.

In some embodiments, the actual motion parameter is an actual displacement;
  wherein the calibration coefficient is obtained through the follow steps:
  when the autonomous mobile device moves at the calibrated chassis-floor distance, obtaining the actual displacement of the autonomous mobile device and the output of the optic flow sensor; wherein the actual displacement is a displacement actually measured using a length measuring tool;
  calculating the calibration coefficient as a ratio between the actual displacement and the output of the optic flow sensor.

In some embodiments, determining, by the processor, the correction coefficient corresponding to the current chassis-floor distance, includes:
  obtaining, by the processor, the correction coefficient through inquiring a pre-stored mapping relationship or through computation, wherein the mapping relationship is a correspondence relationship between multiple to-be-detected chassis-floor distances and correction coefficients.

In some embodiments, the mapping relationship is obtained by the processor through the following steps:
  for multiple to-be-detected chassis-floor distances, when the optic flow sensor moves at the multiple to-be-detected chassis-floor distances, obtaining, by the processor, actual displacements of the optic flow sensor and outputs of the optic flow sensor;
  calculating, by the processor, a correspondence coefficient of the to-be-detected chassis-floor distance as, when the optic flow sensor moves at each to-be-detected chassis-floor distance, a ratio between an actual displacement of the optic flow sensor and an output of the optic flow sensor;
  calculating, by the processor, the correction coefficient corresponding to the to-be-detected chassis-floor distance as a ratio between the correspondence coefficient of the to-be-detected chassis-floor distance and the calibration coefficient, and forming, by the processor, the mapping relationship based on the multiple to-be-detected chassis-floor distances and the corresponding correction coefficients.

In some embodiments, prior to determining, by the processor, the correction coefficient corresponding to the current chassis-floor distance, the method also includes:
    determining, by the processor, whether a changing frequency of the chassis-floor distance within a predetermined time period exceeds a predetermined value;
    when the predetermined value is exceeded, executing an alarming process.

In a second aspect, the present disclosure provides a method for determining a motion parameter of an autonomous mobile device, including:
    for multiple to-be-detected chassis-floor distances, when the optic flow sensor moves at the multiple to-be-detected chassis-floor distances, obtaining, by the processor, actual motion parameters of the optic flow sensor and outputs of the optic flow sensor;
    calculating, by the processor, a correspondence coefficient of the to-be-detected chassis-floor distance as, when the optic flow sensor moves at each to-be-detected chassis-floor distance, a ratio between an actual motion parameter of the optic flow sensor and an output of the optic flow sensor obtained;
    calculating, by the processor, the correction coefficient corresponding to the to-be-detected chassis-floor distance as a ratio between the correspondence coefficient of the to-be-detected chassis-floor distance and the calibration coefficient.

In some embodiments, the actual motion parameter is the actual displacement; wherein calculating the correspondence coefficient of the to-be-detected chassis-floor distance as, when the optic flow sensor moves at each to-be-detected chassis-floor distance, a ratio between an actual motion parameter of the optic flow sensor and an output of the optic flow sensor obtained, includes: calculating, by the processor, the correspondence coefficient of the to-be-detected chassis-floor distance as, when the optic flow sensor moves at each to-be-detected chassis-floor distance, a ratio between the actual displacement of the optic flow sensor and the output of the optic flow sensor.

In a third aspect, the present disclosure provides a method for determining a motion parameter of an autonomous mobile device, including: wherein the autonomous mobile device includes an optic flow sensor, an anti-fall sensor, a motion device, and a processor, wherein the method includes:
    detecting, by the anti-fall sensor, an amount of change in the chassis-floor distance between a chassis of the autonomous mobile device and a floor; wherein the anti-fall sensor controls, based on the amount of change in the chassis-floor distance, the optic flow sensor to extend downwardly or retract upwardly to maintain an optics-floor distance between the optic flow sensor and the floor constant;
    obtaining, by the processor, an output of the optic flow sensor, and determining, by the processor, a motion parameter of the autonomous mobile device based on the output of the optic flow sensor and a calibration coefficient, wherein the calibration coefficient is, when the autonomous mobile device moves at a calibrated chassis-floor distance, a correspondence relationship between the output of the optic flow sensor and an actual displacement; wherein the motion parameter includes at least one of a displacement or a velocity.

In some embodiments, determining, by the processor, the motion parameter of the autonomous mobile device based on the output of the optic flow sensor and the calibration coefficient, includes:
    multiplying, by the processor, the output of the optic flow sensor and the calibration coefficient to obtain the motion parameter of the autonomous mobile device.

In a fourth aspect, the present disclosure provides a method for determining a floor type for the autonomous mobile device, wherein the autonomous mobile device includes an anti-fall sensor, a motion device, and a processor, and wherein the method includes:
    detecting, by the anti-fall sensor, a current chassis-floor distance between a chassis of the autonomous mobile device and a current floor, and transmitting the current chassis-floor distance to the processor;
    determining, by the processor, the floor type of the current floor based on the current chassis-floor distance.

In some embodiments, the method also includes:
    determining, by the processor, an operation mode to be executed by the autonomous mobile device based on the floor type of the current floor.

In some embodiments, the floor type includes at least one hard floor and at least one soft floor; a chassis-hard-floor distance between the chassis of the autonomous mobile device and the hard floor is greater than a chassis-soft-floor distance between the chassis of the autonomous mobile device and the soft floor;
    wherein the operation mode includes: at least one hard floor mode and at least one soft floor mode;
    wherein determining, by the processor, the operation mode to be executed by the autonomous mobile device based on the floor type of the current floor, includes:
    when the floor type of the current floor is any one of the at least one hard floor, determining a corresponding hard floor mode for the autonomous mobile device to execute, when the floor type of the current floor is any one of the at least one soft floor, determining a corresponding soft floor mode for the autonomous mobile device to execute.

In a fifth aspect, the present disclosure provides an autonomous mobile device, including: an optic flow sensor, an anti-fall sensor, a motion device, and a processor; wherein the optic flow sensor, the anti-fall sensor, and the motion device are connected with the processor, respectively;
    wherein the anti-fall sensor is configured to detect a current chassis-floor distance between the chassis of the autonomous mobile device and the current floor;
    wherein the processor is configured to determine a correction coefficient corresponding to the current chassis-floor distance, obtain an output of the optic flow sensor; and determine a motion parameter corresponding to the current chassis-floor distance based on the correction coefficient, a calibration coefficient, and the output of the optic flow sensor.

In a sixth aspect, the present disclosure provides an autonomous mobile device, including: an optic flow sensor, an anti-fall sensor, a motion device, and a processor, wherein the optic flow sensor, the anti-fall sensor, and the motion device are connected with the processor, respectively, and wherein the optic flow sensor and the anti-fall sensor are connected.
    wherein the anti-fall sensor is configured to detect an amount of change in the chassis-floor distance between a chassis of the autonomous mobile device and a floor; and control, based on the amount of change in the chassis-floor distance, the optic flow sensor to extend downwardly or retract upwardly to maintain an optics-floor distance between the optic flow sensor and the floor constant;

wherein the processor is configured to obtain the output of the optic flow sensor, and determine the motion parameter of the autonomous mobile device based on the output of the optic flow sensor and a calibration coefficient, wherein the calibration coefficient is, when the autonomous mobile device moves at a calibrated chassis-floor distance, a correspondence relationship between the output of the optic flow sensor and an actual motion parameter; wherein the motion parameter includes at least one of a displacement or a velocity.

In a seventh aspect, the present disclosure provides an autonomous mobile device, including: an anti-fall sensor, a motion device, and a processor; wherein the anti-fall sensor and the motion device are connected with the processor, respectively;

wherein the anti-fall sensor is configured to detect a current chassis-floor distance between the chassis of the autonomous mobile device and the current floor;

wherein the processor is configured to determine a floor type of the current floor based on the current chassis-floor distance.

In an eighth aspect, the present disclosure provides a non-transitory computer-readable storage medium, wherein when instructions stored in the storage medium are executed by a processor of an autonomous mobile device, the autonomous mobile device executes the method of the first aspect, the second aspect, the third aspect, or the fourth aspect.

According to the device and method for determining the motion parameter of an autonomous mobile device, as provided by the present disclosure, in order to increase the accuracy of the motion parameter, two ideas are provided. The first idea: detecting the current chassis-floor distance between the chassis of the autonomous mobile device and the floor, determining a corresponding correction coefficient based on the current chassis-floor distance, and finally, computing the motion parameter based on the output of the optic flow sensor, the correction coefficient, and the calibration coefficient. The design of the correction coefficient makes the motion parameter obtained through the computation to be closer to an actual motion parameter. The second idea: detecting an amount of change in the chassis-floor distance between the chassis of the autonomous mobile device and the floor, controlling, based on the amount of change in the chassis-floor distance, the optic flow sensor to extend downwardly or retract upwardly, to maintain an optics-floor distance between the optic flow sensor and the floor constant, which in turn makes the motion parameter obtained through computation based on the output of the optic flow sensor to be closer to an actual motion parameter. According to the method for determining a floor type for the autonomous mobile device, as provided by the present disclosure, the floor type of the current floor is determined based on the chassis-floor distance, which can provide more environmental information to the autonomous mobile device, which in turn enables the autonomous mobile device to realize more functions in an actual operation environment.

BRIEF DESCRIPTIONS OF THE DRAWINGS

DESCRIPTIONS OF LABELS OF ACCOMPANYING DRAWINGS

10—autonomous mobile device; 101—processor; 102—optic flow sensor; 103—anti-fall sensor; 104—driving assembly; 105—IMU; 106—camera; 107—microphone; 108—speaker; 109—storage device; 110—communication device; 111—motion device; 112—omni-direction wheel; 113—wheelset; 114—side brush; 115—cleaning device; 116—distance sensor.

DETAILED DESCRIPTION

In order to make the objective, technical solutions and advantages of the present disclosure clearer, next, the technical solutions of the present disclosure will be clearly and comprehensively described with reference to the accompanying drawings. The embodiments described herein are some embodiments of the present disclosure, and are not all of the embodiments. Based on the embodiments of the present disclosure, a person having ordinary skills in the art can obtain other embodiments without spending creative efforts, which are within the scope of protection of the present disclosure.

Figure 1A:
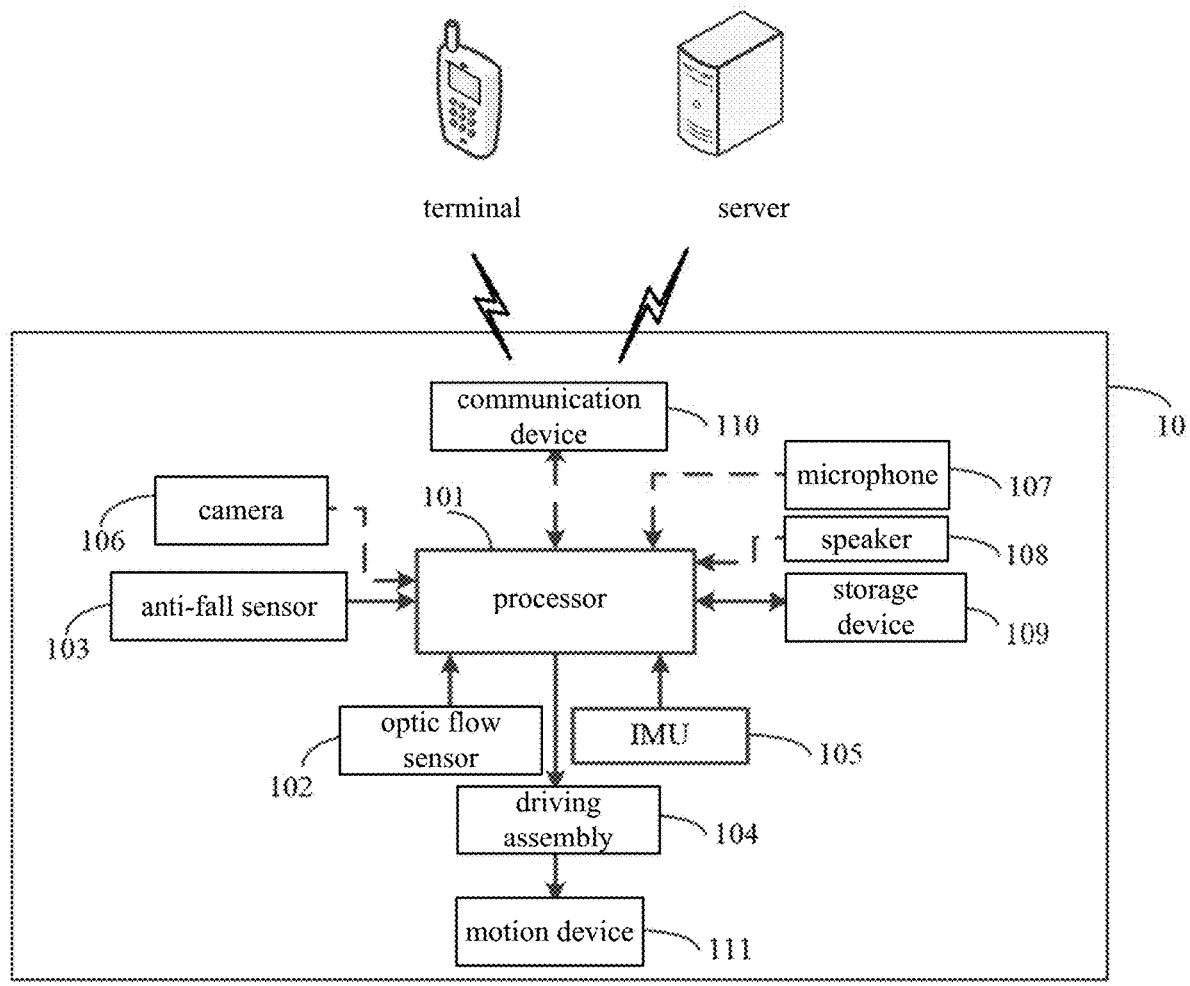
FIG. 1A is a schematic structural illustration of an autonomous mobile device according to an embodiment of the present disclosure.

FIG. 1A is a schematic structural illustration of an autonomous mobile device 10 provided by an embodiment of the present disclosure. As shown in FIG. 1A, the autonomous mobile device 10 provided by the present disclosure includes: a processor 101 and an optic flow sensor 102 connected with the processor 101, an anti-fall sensor 103, a driving assembly 104, a motion device 111 connected with the driving assembly 104, an Inertial Measurement Unit (IMU) 105. In some embodiments, the autonomous mobile device 10 also includes a camera 106, a microphone 107, a speaker 108, a storage device 109, and a communication device 110. It is understood that the processor 101 may be electrically connected with, and may control, various other elements, such as the anti-fall sensor 103, the driving assembly 104, the IMU 105, the camera 106, the microphone 107, the speaker 108, and the storage device 109.

Next, the function of each component will be described one by one:

The anti-fall sensor 103 may be configured to detect a chassis-floor distance between a chassis of the autonomous mobile device 10 and a floor, and transmit the chassis-floor distance to the processor 101. The chassis-floor distance is a distance between the chassis of the autonomous mobile device 10 and the floor underneath the chassis. The chassis-floor distance may be a vertically perpendicular distance, or may be a distance along a slanted downward direction. The chassis-floor distance may also be approximately equal to a distance from the optic flow sensor 102 installed at a bottom portion of the autonomous mobile device 10 and facing the floor to the floor under the optic flow sensor 102, or may be approximately equal to a distance from the anti-fall sensor 103 installed at the bottom portion of the autonomous mobile device 10 and facing the floor to the floor under the anti-fall sensor 103. The term "under" mentioned in the above context can be straight under or obliquely under the pertinent element. The anti-fall sensor 103 of the present disclosure may be any device, apparatus, which has a distance measuring function. As long as it is installed at the bottom portion of the autonomous mobile device and facing the floor, and configured to detect the chassis-floor distance between the chassis of the autonomous mobile device 10 and the floor, such device can be the anti-fall sensor 103 of the present disclosure.

Typical anti-fall sensors include infrared diodes, time of flight (TOF) sensors or ultrasound distance measuring sensors. A basic structure of an anti-fall sensor typically includes at least one emitting terminal and at least one receiving terminal. The emitting terminal is configured to emit a detecting beam/sound wave. The detecting beam can be, for example, an infrared beam or laser. The detecting sound wave may be, for example, an ultrasound wave. The detecting beam/sound wave is reflected after hitting the floor that is of a certain distance away from the anti-fall sensor 103. The reflected beam/sound wave is received by the receiving terminal. The chassis-floor distance between the chassis of the autonomous mobile device 10 and the floor may be calculated based on the detecting beam/sound wave and the reflected beam/sound wave. When used as the anti-fall sensor 103, the infrared diode differs from the TOF in that: the infrared diode determines whether a floor has an abrupt protrusion or depression based on whether its receiving terminal receives or not the reflected beam, or based on the intensity of the reflected beam received by its receiving terminal. If its receiving terminal does not receive the reflected beam or if the intensity of the reflected beam that is received is smaller than a predetermined intensity value, it indicates that the chassis-floor distance between the chassis of the autonomous mobile device 10 and the floor exceeds a predetermined range. After the processor 101 receives the chassis-floor distance transmitted from the anti-fall sensor 103, it determines that the floor has an abrupt protrusion or depression. The protrusion may be, for example, a lamp base or a fan base, and the depression may be, for example, a descending step. The processor 101 may notify the autonomous mobile device 10 to generate an alarm message and/or execute an avoidance operation. The avoidance operation may be, for example, deceleration, stop, and/or making turns, etc. For an infrared diode, the chassis-floor distance may be detected by changing the setting angles of the emitting terminal and the receiving terminal. For example, by changing the setting angles of the emitting terminal and/or the receiving terminal, at different angles, the infrared diode detects the reflected beam reflected by the to-be-detected floor. The chassis-floor distance may be obtained through computation using analytic geometry based on the angles of the emitting terminal and the receiving terminal when the reflected beam is detected. For TOF, first, a time t is obtained, which is between a time instance when the emitting terminal emits the detecting beam and a time instance when the receiving terminal receives the reflected detecting beam. The time t is called the flight time of the detecting beam. The chassis-floor distance may be calculated based on a distance-velocity-time formula $l=c \times t$, wherein, c is the speed of light, l is the chassis-floor distance. If a chassis-floor distance measured within a certain time period is evidently smaller than the chassis-floor distances measured in other time periods, it indicates that the floor traversed by autonomous mobile device within this time period has an obvious protrusion. If the chassis-floor distance measured within a certain time period is evidently greater than the chassis-floor distances measured in other time periods, it indicates that the floor traversed by autonomous mobile device 10 within this time period has an obvious depression. After the processor 101 receives the chassis-floor distance transmitted from the anti-fall sensor 103, it determines that an abrupt protrusion or depression appears on the floor, thereby notifying the autonomous mobile device 10 to generate an alarm message and/or execute avoidance operations. The distance measuring principle of the ultrasound distance measuring device is similar to that of the TOF, except that the velocity is not the light speed c but is the sound speed v. The chassis-floor distance can still be calculated using the distance-velocity-time formula $l=v \times t$.

The processor 101 may be configured to receive the chassis-floor distance transmitted from the anti-fall sensor 103, and to determine whether the chassis-floor distance reaches a fall-alarm value. If the fall-alarm value is reached, it indicates that autonomous mobile device 10 has a risk of falling, e.g., it may be at a depressed step, or has a risk of being elevated which may cause the wheelset to be suspended in the air, for example, at the protruding lamp base. The moving route of the autonomous mobile device 10 may be changed in time to avoid the autonomous mobile device 10 falling and getting damages or being unable to escape a predicament due to the suspension in the air.

In some embodiments, the autonomous mobile device 10 may include a single processor or multiple processors 101. The processor(s) 101 of the autonomous mobile device 10 may be provided on the autonomous mobile device 10, or may be on a server, a cloud terminal, or a mobile terminal (e.g., a cell phone, a computer, etc.). If there are multiple processors 101, the multiple processors 101 may be multiple cores integrated together or may be constructed based on distributive storage devices. For illustrative purposes, FIG. 1A is a schematic illustration of the autonomous mobile device 10 including a single processor 101.

The driving assembly 104 may be configured to be controlled by the control of the processor 101 to drive the motion device 111 to move. The movement of the motion device 111 may cause the autonomous mobile device 10 to move. In some embodiments, the motion device 111 may include an omni-direction wheel 112 disposed at a front bottom portion of the autonomous mobile device 10 and driving wheels 113 symmetrically disposed at two sides of a central axis of the bottom portion of the autonomous mobile device. The driving wheels 113 may be referred to as the wheelset 113. The wheelset 113 is configured to control the moving direction of the autonomous mobile device 10, and to cause the autonomous mobile device 10 to move. The omni-direction wheel 112 may be a follower wheel, which forms a three-point-support stable structure together with the wheelset 113. The present disclosure does not limit the forms and configuration locations of the motion device. For example, the motion device may include multiple wheels that are distributed in a manner different from the above configuration, and/or include track type motion mechanisms symmetrically disposed at the left and right sides of the bottom portion of the autonomous mobile device 10 or dual-legged/multi-legged walking mechanisms.

The optical flow sensor 102 may be installed at the bottom portion of the autonomous mobile device 10 and may face the floor. The optic flow sensor 102 may include at least one image sensor, such as, for example, an optic camera. The image sensor of the optic flow sensor 102 may be disposed on the chassis of the autonomous mobile device 10 and may at least partially face the floor, and may be configured to acquire images of the floor having image textures. The image textures may include decorative patterns, lines, grains. The image textures provide information on the spatial arrangement of colors or intensities in an image or a selected zone in the image. The image sensor of the optic flow sensor 102 acquires images of the floor according to a predetermined frequency. The moving velocity of the autonomous mobile device 10 relative to the floor may be obtained through comparing the changes in the locations of the image textures in images of adjacent frames. Because the frequency in which the image sensor acquires the images is typically fixed or may be set to be fixed, the output of the optic flow sensor 102 may be proportional to the measured velocity of the autonomous mobile device 10. Integration of the measured velocity provides the measured displacement. Thus the output of the optic flow sensor 102 is proportional to the measured displacement of the autonomous mobile device 10. Therefore in the present disclosure, the motion parameters such as the displacement, velocity, may be obtained at least partially based on the output of the optic flow sensor 102. In some embodiments, the optic flow sensor 102 may also include at least one light source configured to provide sufficient and stable illumination to the floor, such that its image sensor can acquire clear and stable images.

In other embodiments, the motion device also includes an odometer configured to measure the displacement of the autonomous mobile device 10. Both of the optic flow sensor 102 and the odometer may be used to measure the displacement of the autonomous mobile device 10. By optimally processing the displacement obtained based on the output of the optic flow sensor 102 and the displacement obtained from the odometer, the displacement of the autonomous mobile device 10 may be more accurate. The IMU 105 includes a gyroscope and an accelerometer. The gyroscope is configured to measure the angular velocity and angular acceleration of the autonomous mobile device 10. An angle of the autonomous mobile device 10 may be obtained from integration of the angular velocity. The accelerometer is configured to measure the acceleration of the autonomous mobile device 10. The velocity may be obtained from integration of the acceleration. Various motion parameters, such as the displacement, velocity, etc., may be obtained from measurement performed by the optic flow sensor 102, the odometer, the IMU, or from computation. The motion parameters may be used for mapping and localization and navigation for the autonomous mobile device 10.

In some embodiments, the camera 106 may be configured to acquire images of surrounding environment of the autonomous mobile device 10. The images may be used for localization and navigation and/or object recognition. The microphone 107 and the speaker 108 may be configured for voice interaction with a user.

The storage device 109 may be configured to store data transmitted by the processor 101 and various sensors. The communication device 110 may be configured for data exchange with terminals and/or servers.

Figure 1B:
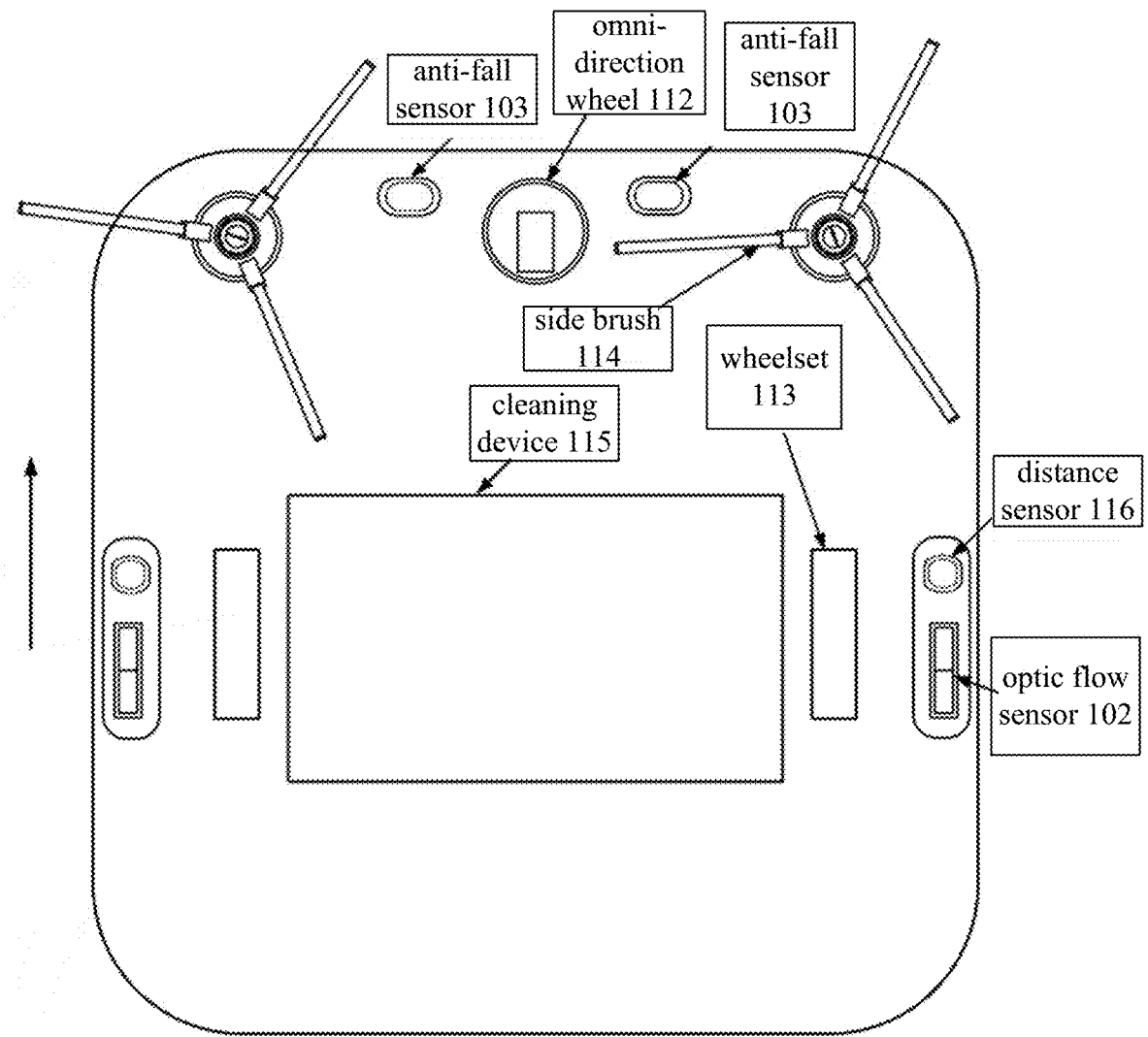
FIG. 1B is a schematic structural illustration of the autonomous mobile device according to an embodiment of the present disclosure.
Figure 1C:
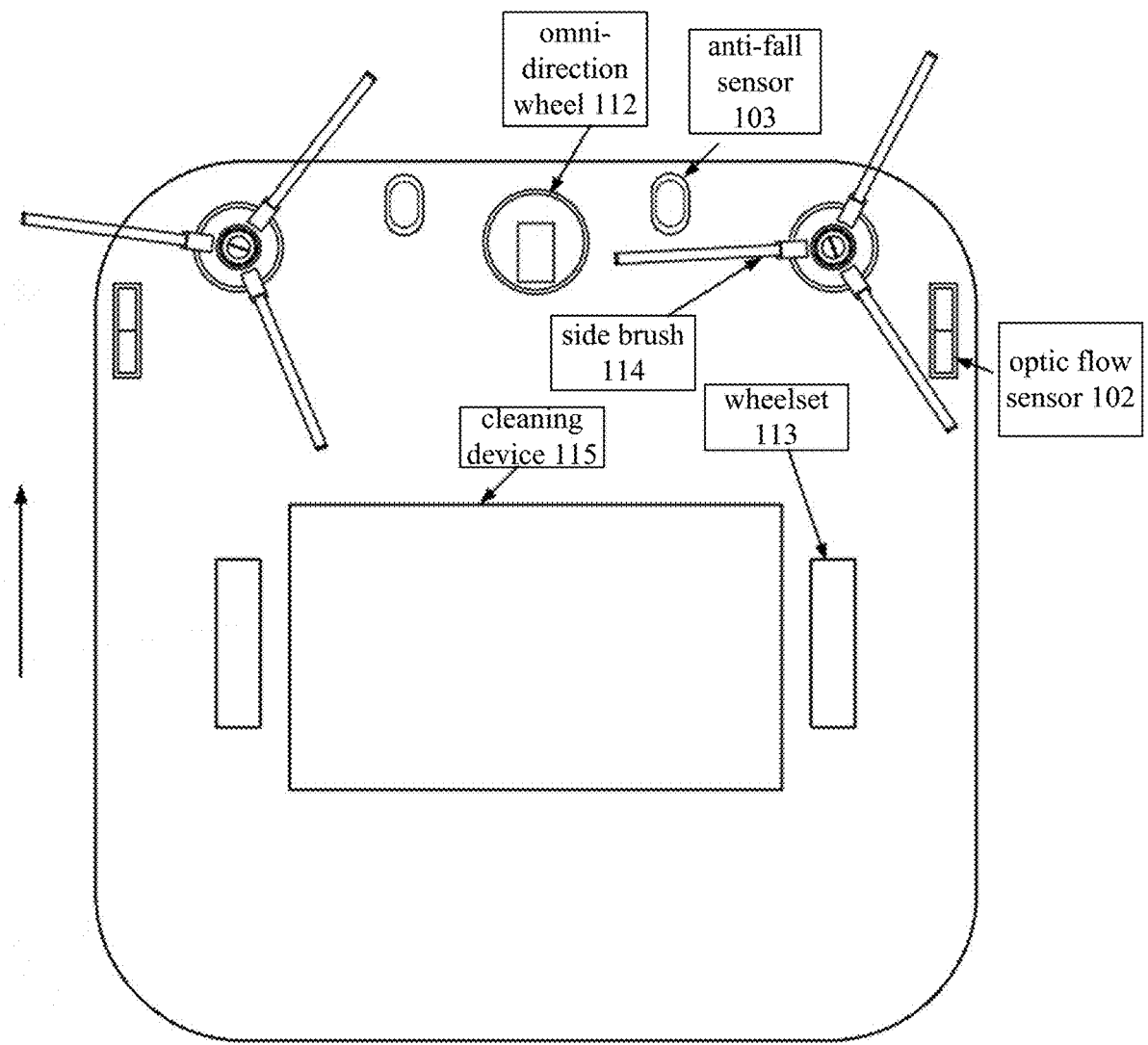
FIG. 1C is a schematic structural illustration of the autonomous mobile device according to an embodiment of the present disclosure.
Figure 1D:
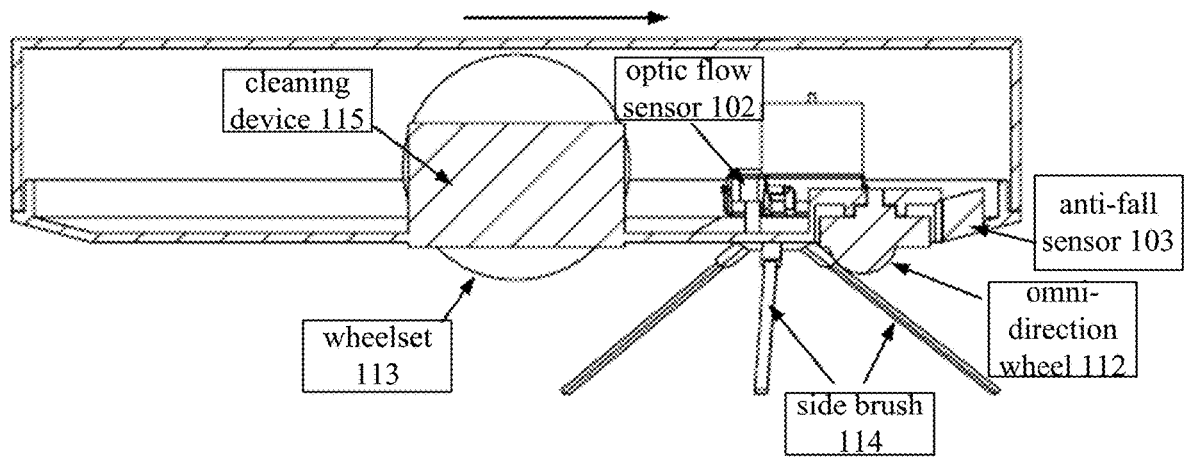
FIG. 1D is a schematic structural illustration of the autonomous mobile device according to an embodiment of the present disclosure.
Figure 1E:
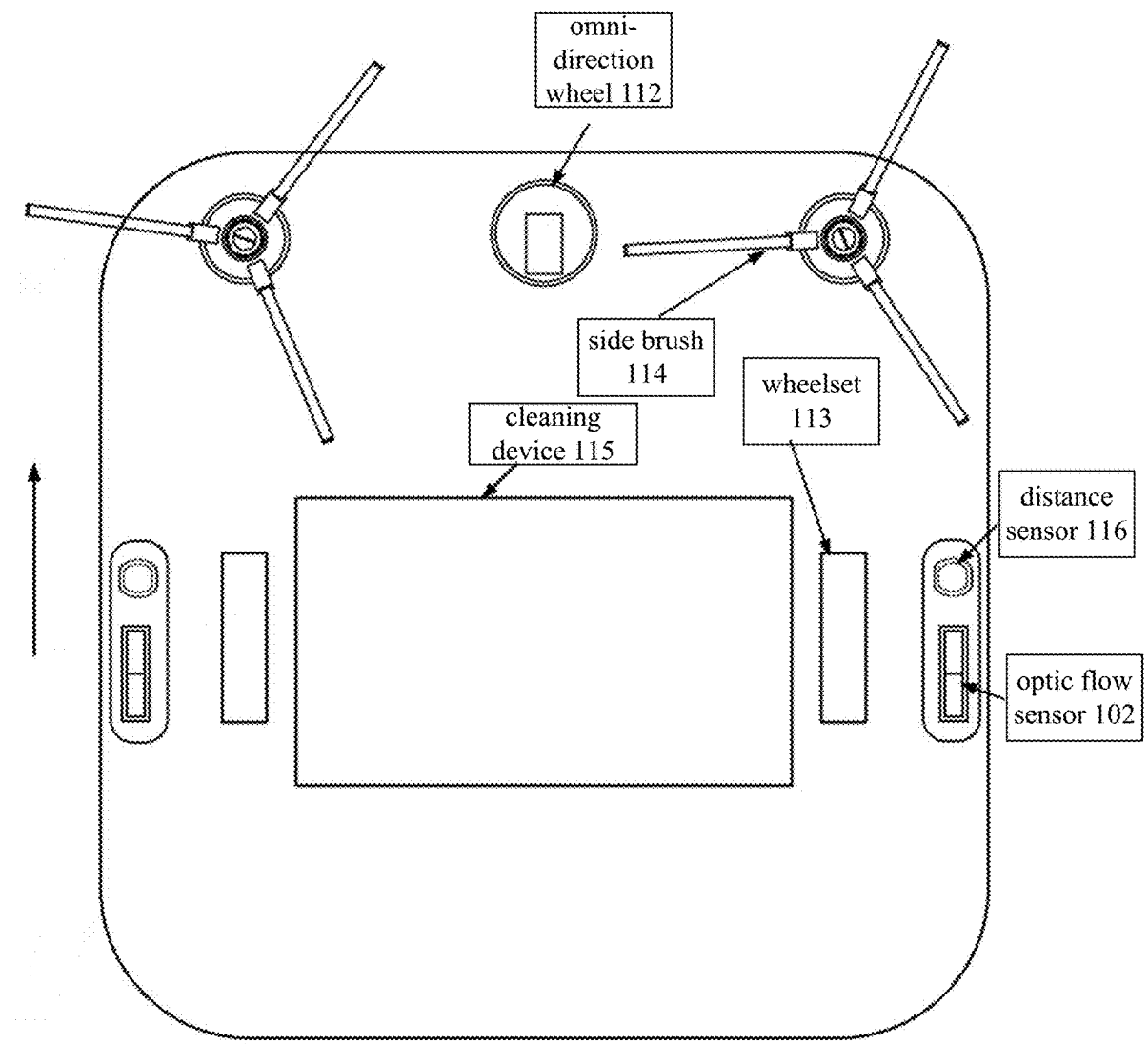
FIG. 1E is a schematic structural illustration of the autonomous mobile device according to an embodiment of the present disclosure.
Figure 1F:
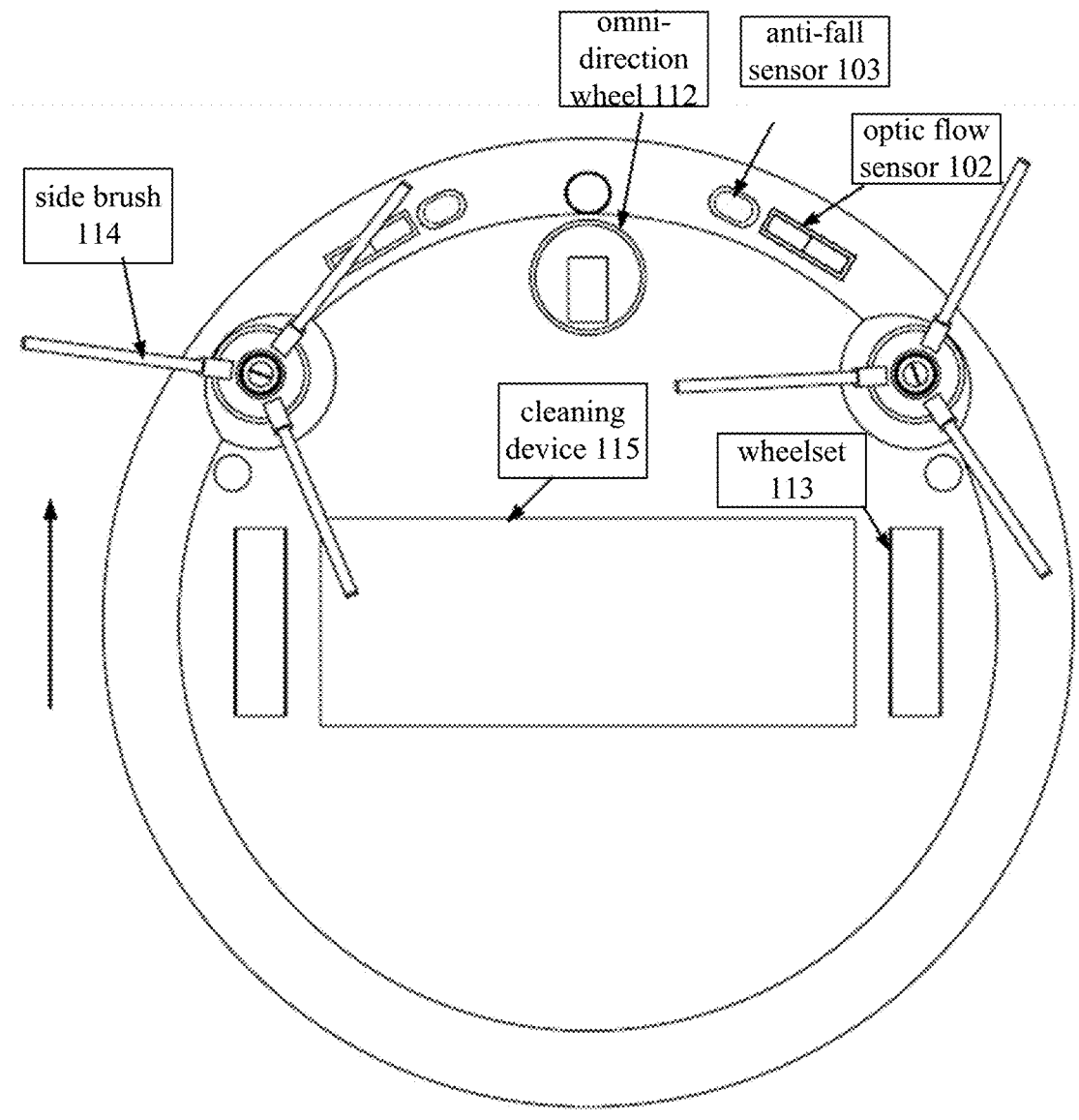
FIG. 1F is a schematic structural illustration of the autonomous mobile device according to an embodiment of the present disclosure.

In some embodiments, the autonomous mobile device 10 shown in FIG. 1A may be the floor mopping device shown in FIG. 1B to FIG. 1E and the floor sweeping device shown in FIG. 1F, wherein FIG. 1B, FIG. 1C, FIG. 1E are the bottom views of the floor mopping device, FIG. 1D is a side view of the floor mopping device shown in FIG. 1C, FIG. 1F is a bottom view of the floor sweeping device. As shown in FIG. 1C, FIG. 1D, and FIG. 1E, the optic flow sensor 102 and the anti-fall sensor 103 are both disposed at the bottom portion of the autonomous mobile device 10 and face the floor, and are electrically connected with the processor 101 (not shown in the figures). The anti-fall sensor 103 may be disposed in front of the optic flow sensor 102 along the moving direction (the arrow direction in the figures) of the autonomous mobile device 10. The omni-direction wheel 112 included in the motion device 111 may be disposed at a front bottom portion of the autonomous mobile device 10. The wheelset 113 of the motion device 111 may be disposed at two sides of the central axis of the bottom portion of the autonomous mobile device 10, such that the omni-direction wheel 112 and the wheelset 113 form a three-point-support balanced structure, which enables the autonomous mobile device 10 to maintain balance and stability at any time during a movement process. When the autonomous mobile device 10 is a cleaning robot, its bottom portion may be provided with a side brush 114 and a cleaning device 115. When the autonomous mobile device 10 is a floor mopping device, the cleaning device 115 may be a mop, or a mop and a main brush. When the autonomous mobile device 10 is a floor sweeping device, the cleaning device 115 is typically a main brush. The side brush 114 may be an optional component, which may or may not be included. It should be noted that: in FIG. 1B to FIG. 1E, the disposition locations of the optic flow sensor 102 and the anti-fall sensor 103 are only exemplary illustration, and they may also be disposed at other suitable locations at the bottom portion of the autonomous mobile device 10, which is not limited in the present disclosure.

Figure 1G:
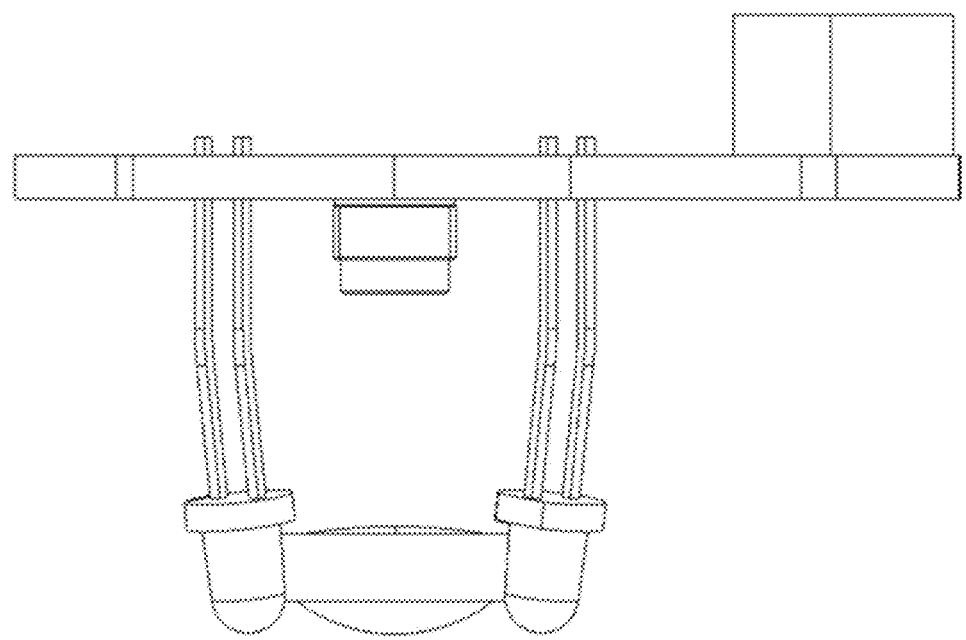
FIG. 1G is a schematic structural illustration of an optic flow sensor included in the autonomous mobile device according to an embodiment of the present disclosure.

Illustratively, the optic flow sensor 102 may be a single-mode optic flow sensor shown in FIG. 1G, or may be any other existing optic flow sensors on the market, such as infrared/LED dual light source type optic flow sensor such as PAA5101EW-M sold by PixArt.

Figure 2:
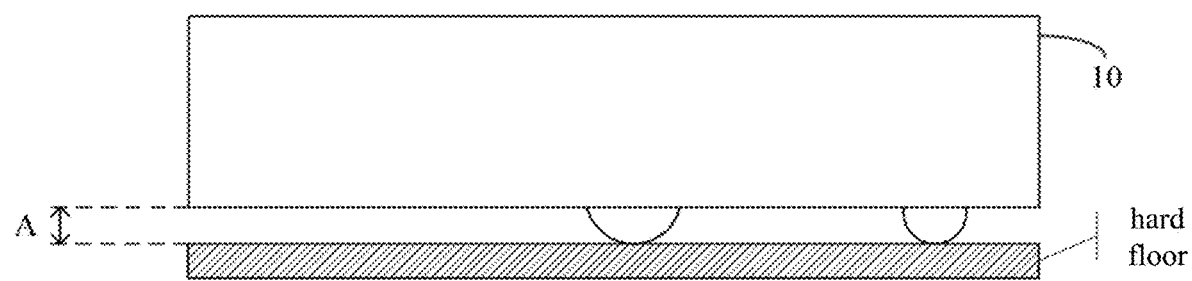
FIG. 2 is a side view of a schematic illustration of the autonomous mobile device on a hard floor, according to an embodiment of the present disclosure.
Figure 3:
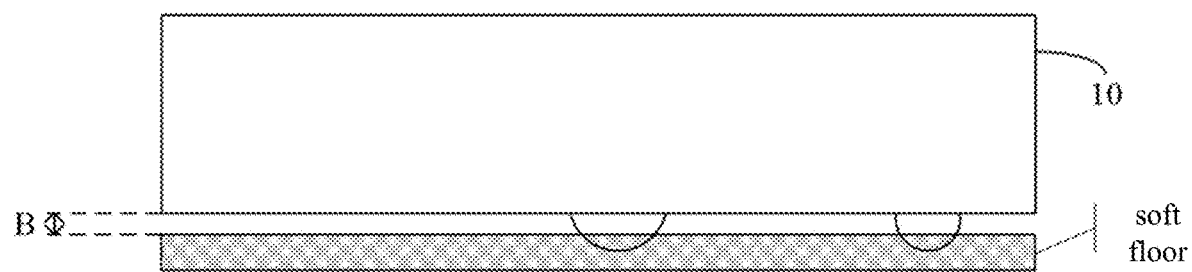
FIG. 3 is a side view of a schematic illustration of the autonomous mobile device on a soft floor, according to an embodiment of the present disclosure.

FIG. 2 is a side view of the autonomous mobile device 10 on a hard floor. FIG. 3 is a side view of the autonomous mobile device 10 on a soft floor. As shown in FIG. 2, when the autonomous mobile device 10 moves on the hard floor, a chassis-floor distance between the chassis of the autonomous mobile device 10 and the floor is A mm. The hard floor may be, for example, a wood floor or a marble tile, etc. As shown in FIG. 3, the autonomous mobile device 10 may move on a soft floor. The soft floor may be, for example, a carpet. When the autonomous mobile device 10 moves on the carpet, because the carpet is relatively soft, the carpet located below the motion device of the autonomous mobile device 10 may sink. For example, the carpet located under the wheelset may sink, but most of the floor portion corresponding to the chassis (including the portion where the anti-fall sensor 103 is installed and the portion where the optic flow sensor 102 is installed) of the autonomous mobile device 10 do not sink, such that the chassis-floor distance between the chassis of the autonomous mobile device 10 and the floor reduces to B mm, as shown in FIG. 3. The anti-fall sensor 103 may detect a change in the chassis-floor distance caused by the sink of the soft floor located below the wheelset 113. However, because the change in the chassis-floor distance is relatively small, typically only a few millimeters, typically not more than 3 centimeters, but in order for the processor 101 to provide a command for generating an alarm message and/or executing an avoidance operation to the autonomous mobile device 10, the corresponding change in the chassis-floor distance is at least greater than 5 centimeters. Therefore, the change in the chassis-floor distance caused by the sink of the soft floor is typically insufficient to cause the processor 101 to provide a command for generating an alarm and/or executing an avoidance operation to the autonomous mobile device 10.

Figure 4:
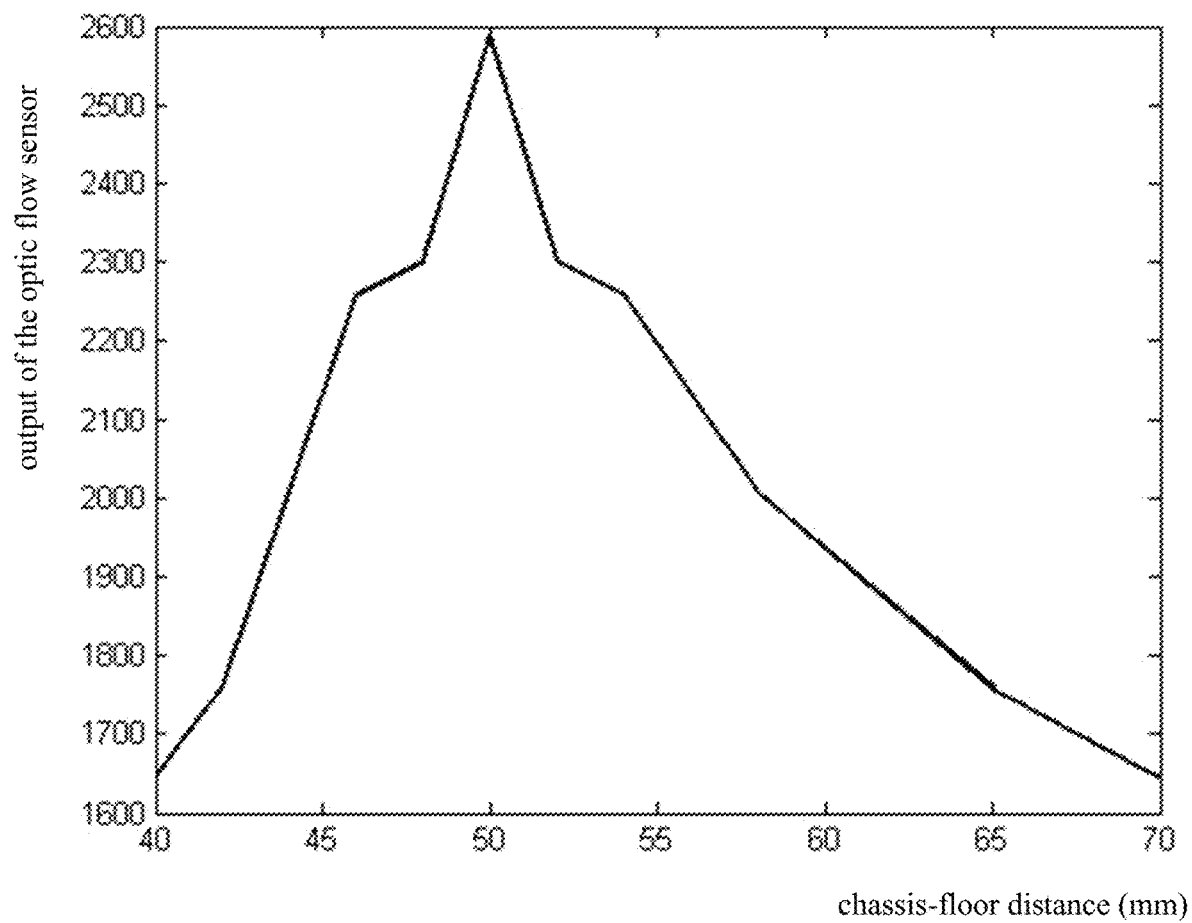
FIG. 4 is a schematic illustration of a relationship between a chassis-floor distance and an output of an optic flow sensor, according to an embodiment of the present disclosure.

In actual implementations, it is observed that when the chassis-floor distance between the optic flow sensor 102 installed at the bottom portion of the autonomous mobile device 10 and the floor changes, even when the autonomous mobile device 10 moves at a constant speed, the output of the optic flow sensor 102 can still change. As shown in FIG. 4, for example, when the autonomous mobile device 10 moves on a hard floor such as a wood floor, the chassis-floor distance is 70 mm, the output of the optic flow sensor 102 moving at a certain speed is 1650. When the autonomous mobile device 10 moves on a soft floor such as a long-fiber carpet, the chassis-floor distance is 50 mm, the output of the optic flow sensor 102 moving at the same speed is 2600.

Assuming that the correction or calibration has been performed on the soft floor, i.e., when the chassis-floor distance is 50 mm, the output of the optic flow sensor 102 is proportional to the actual motion parameter of the autonomous mobile device 10, then when the autonomous mobile device 10 moves to the hard floor to which the chassis-floor distance is 70 mm, the error can be as high as 40%.

Assuming that the correction or calibration has been performed on the hard floor, i.e., when the chassis-floor distance is 70 mm, the output of the optic flow sensor 102 is proportional to the actual motion parameter of the autonomous mobile device 10, then when the autonomous mobile device 10 moves to the soft floor to which the chassis-floor distance is 50 mm, the error can be as high as 60%.

The above actual motion parameter may be the actual velocity or actual displacement.

As such, when the autonomous mobile device 10 moves on floors of different materials, a relatively large error may occur between the measured velocity/measured displacement obtained through computation based on the output of the optic flow sensor 102 and the actual velocity/actual displacement of the autonomous mobile device 10, thereby causing inaccuracy in the velocity/displacement of the autonomous mobile device 10 measured by the optic flow sensor 102. Currently in the pertinent technical field, companies have not paid attention to this issue, and have not provided feasible technical solutions to address this issue.

In order to address the issue relating to the relatively large error in the measured velocity/measured displacement of the autonomous mobile device 10 when moving at different chassis-floor distances, the present disclosure provides two ideas. The first idea: detecting the current chassis-floor distance between the chassis of the autonomous mobile device 10 and the floor, determining a correction coefficient corresponding to the current chassis-floor distance, and finally obtaining a motion parameter through computation based on the output of the optic flow sensor 102, the correction coefficient, and a calibration coefficient. The design of the correction coefficient makes the motion parameter obtained through computation to be closer to the actual motion parameter. The second idea: detecting an amount of change in the chassis-floor distance between the chassis of the autonomous mobile device 10 and the floor, controlling, based on the amount of change in the chassis-floor distance, the optic flow sensor 102 to extend downwardly or retract upwardly, to maintain the optics-floor distance between the optic flow sensor 102 and the floor constant, which in turn makes the motion parameter obtained through computation based on the output of the optic flow sensor 102 to be closer to the actual motion parameter.

Figure 5:
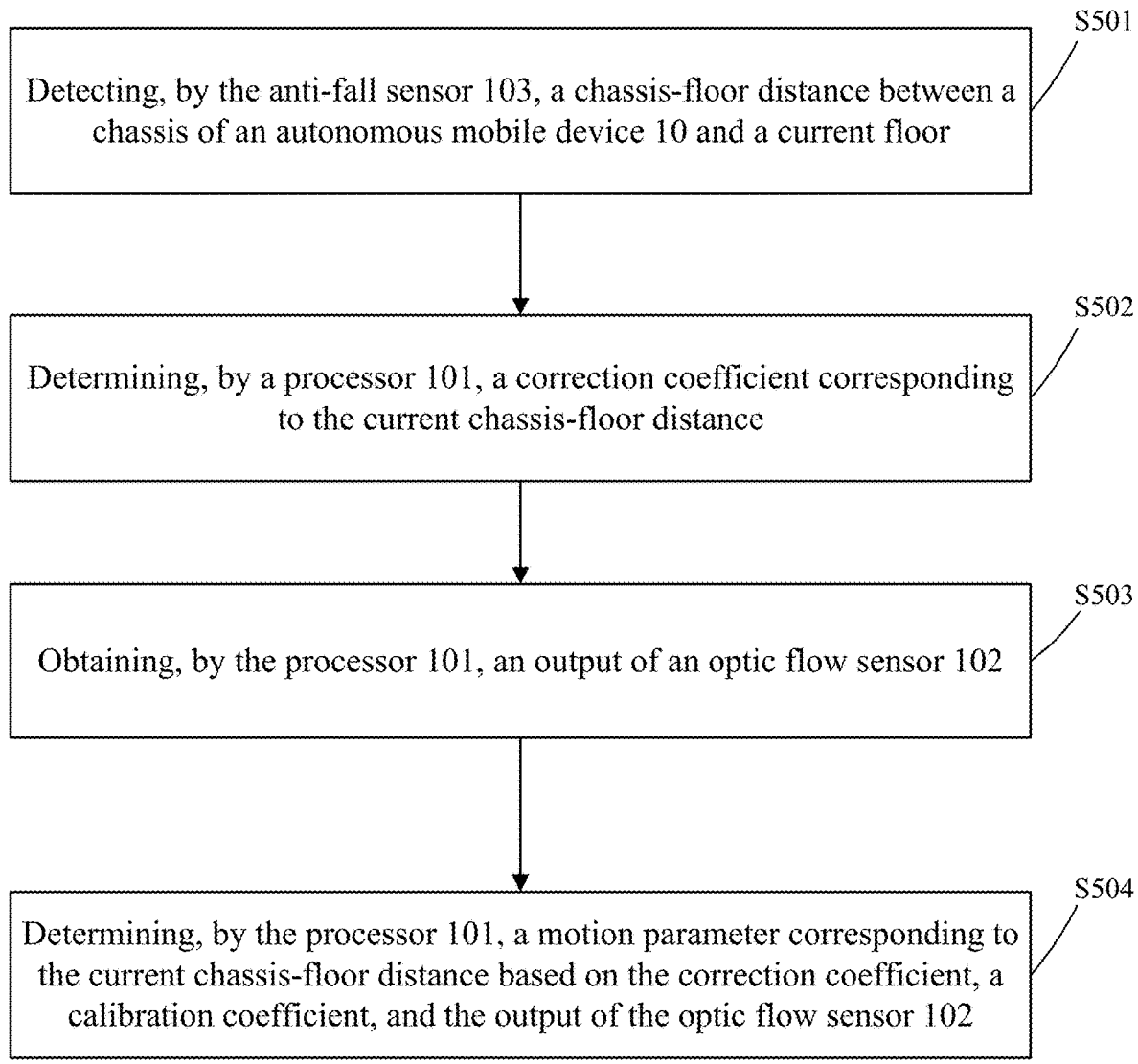
FIG. 5 is a schematic illustration of a flowchart showing a process of a first embodiment of the present disclosure.

According to the first idea, FIG. 5 is a schematic flowchart according to a first embodiment provided by the present disclosure. As shown in FIG. 5, the method for determining a motion parameter provided by the present disclosure includes:

S501: detecting, by the anti-fall sensor 103, the current chassis-floor distance between the chassis of the autonomous mobile device 10 and the current floor.

Specifically, an infrared diode or a TOF may be used to detect the current chassis-floor distance between the chassis of the autonomous mobile device 10 and the floor. The detecting principle of the infrared diode or TOF can refer to the above functional descriptions relating to the anti-fall sensor 103, which are not repeated in the present disclosure.

S502: determining, by the processor 101, a correction coefficient corresponding to the current chassis-floor distance.

Next, the definition and acquisition method for the calibration coefficient, and the definition and acquisition method of the correction coefficient will be introduced.

First, the definition and acquisition method for the calibration coefficient will be introduced:

The calibration coefficient is, when the autonomous mobile device 10 moves at a calibrated chassis-floor distance, a correspondence relationship between the output of the optic flow sensor 102 and the actual motion parameter.

The above actual motion parameter may be the actual displacement, and the calibration coefficient may be acquired through the following method:

when the autonomous mobile device 10 moves at the calibrated chassis-floor distance, obtaining an actual displacement of the autonomous mobile device 10 and an output of the optic flow sensor 102, and calculating the calibration coefficient as a ratio between the actual displacement and the output of the optic flow sensor 102.

It should be noted: the above actual displacement is a displacement actually measured through a length measuring tool. The length measuring tool may be, for example, a ruler or a distance measuring device, such as a Light Detection and Ranging (Lidar) device, an ultrasound distance measuring device, etc. The calibration coefficient may be defined as the correspondence relationship between the output of the optic flow sensor 102 and the actual velocity when the autonomous mobile device 10 moves at the calibrated chassis-floor distance. The actual velocity may be obtained through a encoder wheel (or called encoder), or the actual velocity may be obtained thorough integrating the acceleration measured by the accelerometer. Alternatively, the actual displacement may be measured by the ruler or distance measuring device and the time for the autonomous mobile device to move for the actual displacement may be recorded, and the actual velocity may be obtained through computation based on the actual displacement and the time spent for moving the actual displacement. A ratio between the output of the optic flow sensor during moving for the actual displacement and the moving time for the actual displacement may be computed. The correspondence relationship between the ratio and the actual velocity may be the calibration coefficient under this circumstance. The present disclosure does not limit the method for acquiring the actual displacement or the actual velocity.

For the convenience of describing the present disclosure clearly, illustratively, the actual displacement is used as the actual motion parameter in the following descriptions, i.e., the calibration coefficient is defined as, when the autonomous mobile device 10 moves at the calibrated chassis-floor distance, the correspondence relationship between the output of the optic flow sensor 102 and the actual displacement.

Before the autonomous mobile device leaves a factory, the optic flow sensor 102 is typically calibrated, such that the output of the optic flow sensor 102 can reflect the displacement of the autonomous mobile device under typical use scenarios. Next, the method for acquiring the calibration coefficient is explained through examples:

Assuming that after the autonomous mobile device 10 is assembled, before it leaves the factory, it is placed on a frequently-used floor. The distance between its chassis and the frequently-used floor, i.e., the calibrated chassis-floor distance, is 70 mm. Alternatively, before the autonomous mobile device 10 leaves the factory, the autonomous mobile device 10 is placed on a frequently-used floor, and the distance between the chassis of the autonomous mobile device 10 and the floor is adjusted to 70 mm. Then, the autonomous mobile device 10 is started, such that the autonomous mobile device 10 moves at the chassis-floor distance of 70 mm, the actual displacement of the autonomous mobile device 10 may be measured using measuring tools such as a ruler, a ratio between the actual displacement measured by the ruler and the output of the optical flow sensor 102 is used as the calibration coefficient. For example, when the actual displacement of the autonomous mobile device 10 measured by the ruler is 16500 mm, the output of the optic flow sensor 102 of the autonomous mobile device 10 is 1650 mm, then the calibration coefficient=16500 mm/1650 mm=10.

It should be noted: if in actual implementations the autonomous mobile device 10 mostly moves on hard floors, i.e., the frequently-used floor is a hard floor, when calibrating the optic flow sensor 102 of the autonomous mobile device, the calibration may be performed by placing the autonomous mobile device on a hard floor, such as a wood floor or porcelain tile floor. If in actual implementations the autonomous mobile device 10 mostly move on soft floors, i.e., the frequently-used floor is a soft floor, when calibrating the optic flow sensor 102 of the autonomous mobile device, the calibration may be performed by placing the autonomous mobile device on a soft floor, such as a carpet.

The above are the definition and the acquisition method for the calibration coefficient.

Next, the definition and acquisition method for the correction coefficient will be introduced:

The correction coefficient is used to correct the calibration coefficient when the current chassis-floor distance is different from the calibrated chassis-floor distance, to obtain a motion parameter that corresponds to the current chassis-floor distance. In some embodiments, when the processor of the autonomous mobile device determines the motion parameter corresponding to the current chassis-floor distance based on the correction coefficient, the calibration coefficient, and the output of the optic flow sensor, the processor may be configured to correct the calibration coefficient using the correction coefficient, when the current chassis-floor distance is different from the calibrated chassis-floor distance, to obtain a motion parameter that corresponds to the current chassis-floor distance. In some embodiments, correcting the calibration coefficient may include multiplying the calibration coefficient with the correction coefficient, and obtaining the motion parameter may include multiplying the output of the optic flow sensor with a result of the multiplication of the calibration coefficient and the correction coefficient.

The correction coefficient may be obtained through the following method:

obtaining, by the processor 101, the correction coefficient through inquiring a pre-stored mapping relationship or through computation. The mapping relationship is a correspondence relationship between multiple to-be-detected chassis-floor distances and correction coefficients.

Next, the method for acquiring the mapping relationship will be introduced:

For multiple to-be-detected chassis-floor distances, when the optic flow sensor 102 moves at the multiple to-be-detected chassis-floor distances, actual displacements of the optic flow sensor 102 and outputs of the optic flow sensor 102 are obtained; when the optic flow sensor 102 moves at each to-be-detected chassis-floor distance, a ratio between an actual displacement of the optic flow sensor 102 and an output of the optic flow sensor 102 is obtained and used as a correspondence coefficient of the to-be-detected chassis-floor distance; a correction coefficient corresponding to the to-be-detected chassis-floor distance is determined based on a ratio between the correspondence coefficient of the to-be-detected chassis-floor distance and the calibration coefficient. The above to-be-detected chassis-floor distance is the distance between the optic flow sensor 102 and the to-be-detected floor, or the distance between the chassis of the autonomous mobile device 10 equipped with the optic flow sensor 102 and the to-be-detected floor. When the optic flow sensor 102 is installed at the bottom portion of the autonomous mobile device 10, a camera of the optic flow sensor 102 has a fixed distance difference with the chassis of the autonomous mobile device 10. For example, the optic flow sensor 102 may be disposed at a location on the bottom portion of the autonomous mobile device 10 that is depressed upwardly into the chassis for about 3 cm. Then, the distance between the optic flow sensor 102 and the to-be-detected floor (computed using the distance between the camera of the optic flow sensor 102 and the to-be-detected floor) is greater than the distance between the chassis of the autonomous mobile device 10 and the to-be-detected floor for a fixed amount of distance difference of about 3 cm. Thus, the above two definitions of the "to-be-detected chassis-floor distance" differ for a fixed distance difference, which does not affect the understanding and implementation of the present disclosure. A person having ordinary skills in the art should understand, it is easy to convert between the distance between the optic flow sensor 102 and the to-be-detected floor and the distance between the autonomous mobile device 10 and the to-be-detected floor. For the convenience of descriptions, unless otherwise noted, in the present disclosure, the to-be-detected chassis-floor distance is defined using the distance between the chassis of the autonomous mobile device 10 and the to-be-detected floor.

Next, examples are explained:

Assuming a calibrated chassis-floor distance is 70 mm, the calibration coefficient obtained through the above-described method is 10, the to-be-detected chassis-floor distance is 50 mm, the distance between the optic flow sensor 102 and the floor is adjusted to be 50 mm, such that the autonomous mobile device 10 moves in the scene in which the chassis-floor distance is 50 mm. The actual displacement of the autonomous mobile device 10 is measured using a ruler. A ratio between the actual displacement measured using the ruler and an output of the optic flow sensor 102 is used as the correspondence coefficient for this 50 mm. For example, when the actual displacement measured using the ruler is 16500 mm, the output of the autonomous mobile device 10 is 2600 mm, then the correspondence coefficient when the to-be-detected chassis-floor distance is 50 mm=16500 mm/2600 mm≈6.346. A ratio between the correspondence coefficient when the to-be-detected chassis-floor distance is 50 mm and the calibration coefficient, 6.346/10=0.6346, may be used as the correction coefficient corresponding to the to-be-detected chassis-floor distance of 50 mm. For all to-be-detected chassis-floor distances, the above computation is performed, and correction coefficients corresponding to all to-be-detected chassis-floor distances may be obtained. The functional relationship or correspondence curve between each to-be-detected chassis-floor distance and its corresponding correction coefficient is the mapping relationship.

In the above example, the reciprocal of the ratio 6.346/10, i.e., 10/6.346≈1.577, is also a ratio between the actual displacement of the optic flow sensor 102 and the output of the optic flow sensor 102, and therefore can also be used as the correction coefficient corresponding to the chassis-floor distance. The functional relationship for measuring the motion parameter that is formed by the correction coefficient, the calibration coefficient, and the output of the optic flow sensor needs to be adjusted correspondingly. For example, a measured displacement that is close to the actual displacement may be obtained by multiplying the calibration coefficient with the output of the optic flow sensor and divided by the correction coefficient. A person having ordinary skills in the art can understand and realize the above adjustment without spending creative effort when inspired by the above-described embodiments.

Figure 6:
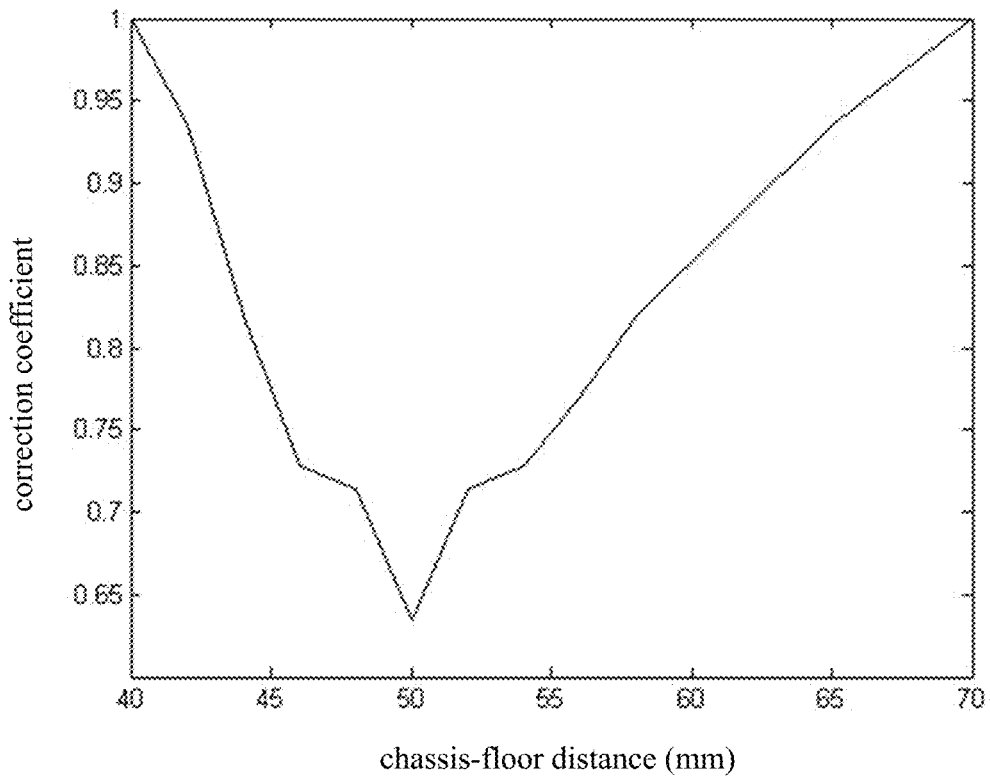
FIG. 6 is a schematic illustration of a relationship between a chassis-floor distance and a correction coefficient, according to an embodiment of the present disclosure.

In some implementations, if a mapping relationship indicated by the curve shown in FIG. 6 is obtained, after the processor 101 receives the current chassis-floor distance transmitted from the anti-fall sensor, the correction coefficient corresponding to the current chassis-floor distance can be obtained by inquiring the curve shown in FIG. 6. For example, when the calibrated chassis-floor distance of the autonomous mobile device 10 is 70 mm, the calibration coefficient obtained may be 10, when the autonomous mobile device 10 moves on a certain floor, the current chassis-floor distance detected by the anti-fall sensor may be 50 mm, the chassis-floor distance of 50 mm may be provided back to the processor. Based on the current chassis-floor distance, the processor may inquire from the mapping relationship shown in FIG. 6, that the correction coefficient on the vertical axis corresponding to the to-be-detected chassis-floor distance that is the same as the current chassis-floor distance=50 mm on the horizontal axis, is 0.6346. Multiplying this value with a calibration coefficient of 10 and the output of the optic flow sensor arrives at the measured displacement of 16499.6 mm when the current chassis-floor distance is 50 mm. This measured displacement value is close to the actual displacement of 16500 mm.

In some embodiments, the mapping relationship obtained through the above method may be a formula. Illustratively, the formula may be formula 1:

$$y=0.0013 \cdot x^2 - 0.1364 \cdot x + 4.2201 \qquad \text{(formula 1)}$$

wherein, y stands for the correction coefficient, x stands for the chassis-floor distance.

After the processor 101 receives the current chassis-floor distance transmitted from the anti-fall sensor, the current chassis-floor distance may be substituted into the formula 1 as x, and the correction coefficient y corresponding to the current chassis-floor distance may be obtained.

It should be noted: formula 1 is a formula obtained through theoretical derivation, it can also be a formula obtained through fitting the curve shown in FIG. 6. For example, when x=50 is substituted into the above fitted formula 1, y=0.65 may be obtained, which is close to the correction coefficient of 6.346 obtained from FIG. 6.

S503: obtaining, by the processor 101, the output of the optic flow sensor 102.

The optic flow sensor 102 may periodically report the outputs to the processor 101, or may report the outputs to the processor 101 in real time, or the processor 101 may transmit a report instruction to the optic flow sensor 102, after the optic flow sensor 102 receives the report instruction, the optic flow sensor 102 may report the outputs to the processor 101. The present disclosure does not limit this aspect.

S504: determining, by the processor 101, a motion parameter corresponding to the current chassis-floor distance based on the correction coefficient, the calibration coefficient, and the output of the optic flow sensor 102. The motion parameter corresponding to the current chassis-floor distance approaches the actually measured motion parameter, and is very close to the actually measured motion parameter, and may be used to replace the actually measured motion parameter for computation such that the autonomous mobile device can perform more accurate localization and mapping.

The processor 101 may multiply the correction coefficient, the output of the optic flow sensor, and the calibration coefficient to obtain the motion parameter corresponding to the current chassis-floor distance.

In some embodiments, the processor 101 may multiply the correction coefficient and the calibration coefficient to obtain a correspondence coefficient of the current chassis-floor distance, and multiply the correspondence coefficient of the current chassis-floor distance with the output of the optic flow sensor 102 to obtain the motion parameter corresponding to the current chassis-floor distance.

In some embodiments, the processor 101 may multiply the calibration coefficient with the output of the optic flow sensor 102 to obtain an initial motion parameter, and then multiply the correction coefficient with the initial motion parameter to obtain the motion parameter corresponding to the current chassis-floor distance.

In order to avoid the waste of computational resources and errors in the measured displacement caused by repeating the above computation even when the autonomous mobile device 10 operates abnormally, the method for determining the motion parameter provided by this embodiment also includes:

determining, by the processor 101, whether a changing frequency of the chassis-floor distance within a predetermined time period exceeds a predetermined value; when the predetermined value is exceeded, then the processor 101 executes an alarming process, or stops executing steps S501-S504.

According to the method for determining the motion parameter provided by this embodiment, by detecting the current chassis-floor distance between the chassis of the autonomous mobile device and the floor, the correction coefficient corresponding to the current chassis-floor distance may be determined, and the motion parameter may be obtained through computation based on the output of the optic flow sensor, the correction coefficient, and the calibration coefficient. The design of the correction coefficient makes the motion parameter obtained through computation to be closer to the actual motion parameter, which enables more accurate feedback of motion data of the autonomous mobile device.

Figure 7:
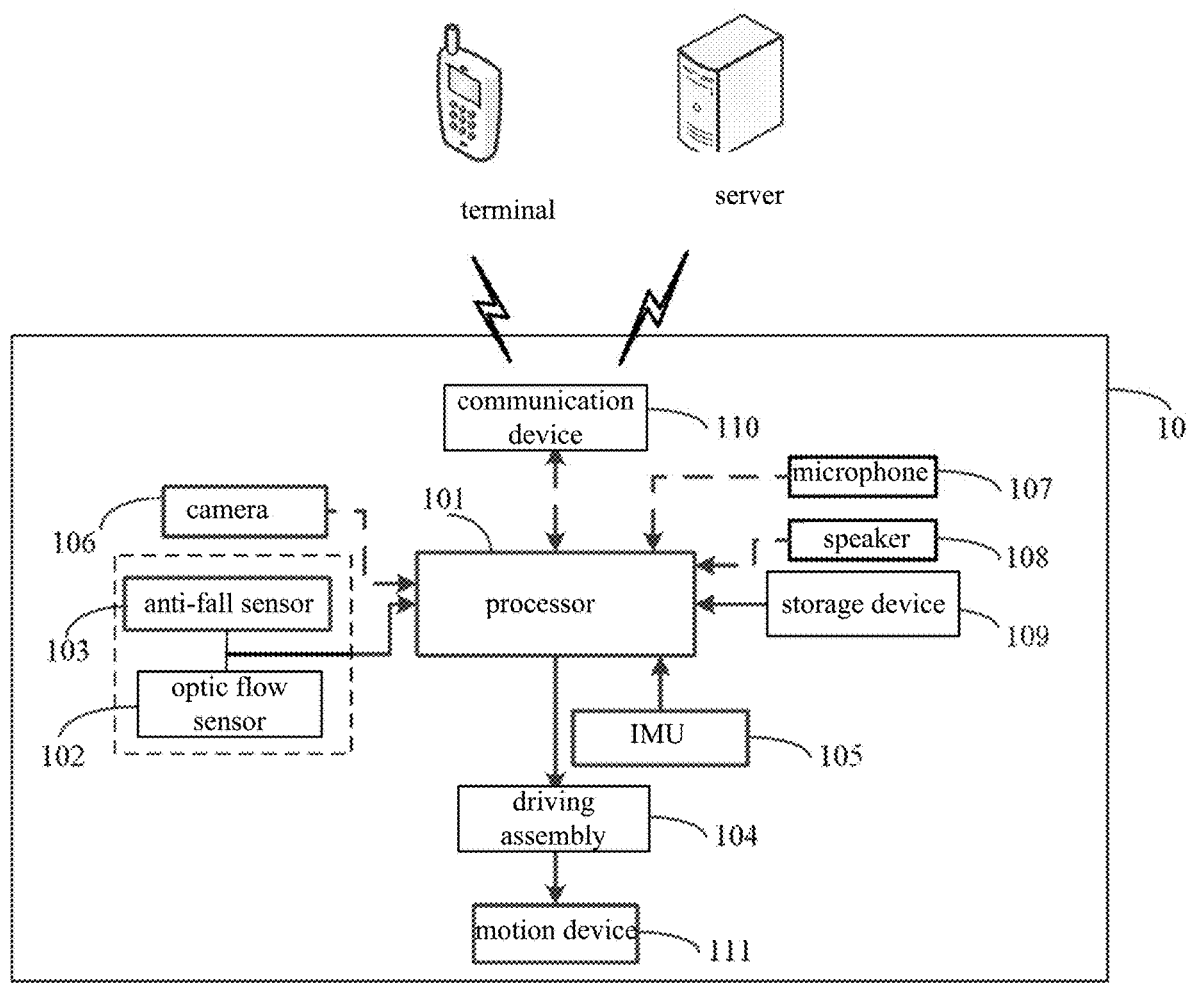
FIG. 7 is a schematic structural illustration of the autonomous mobile device according to an embodiment of the present disclosure.
Figure 8:
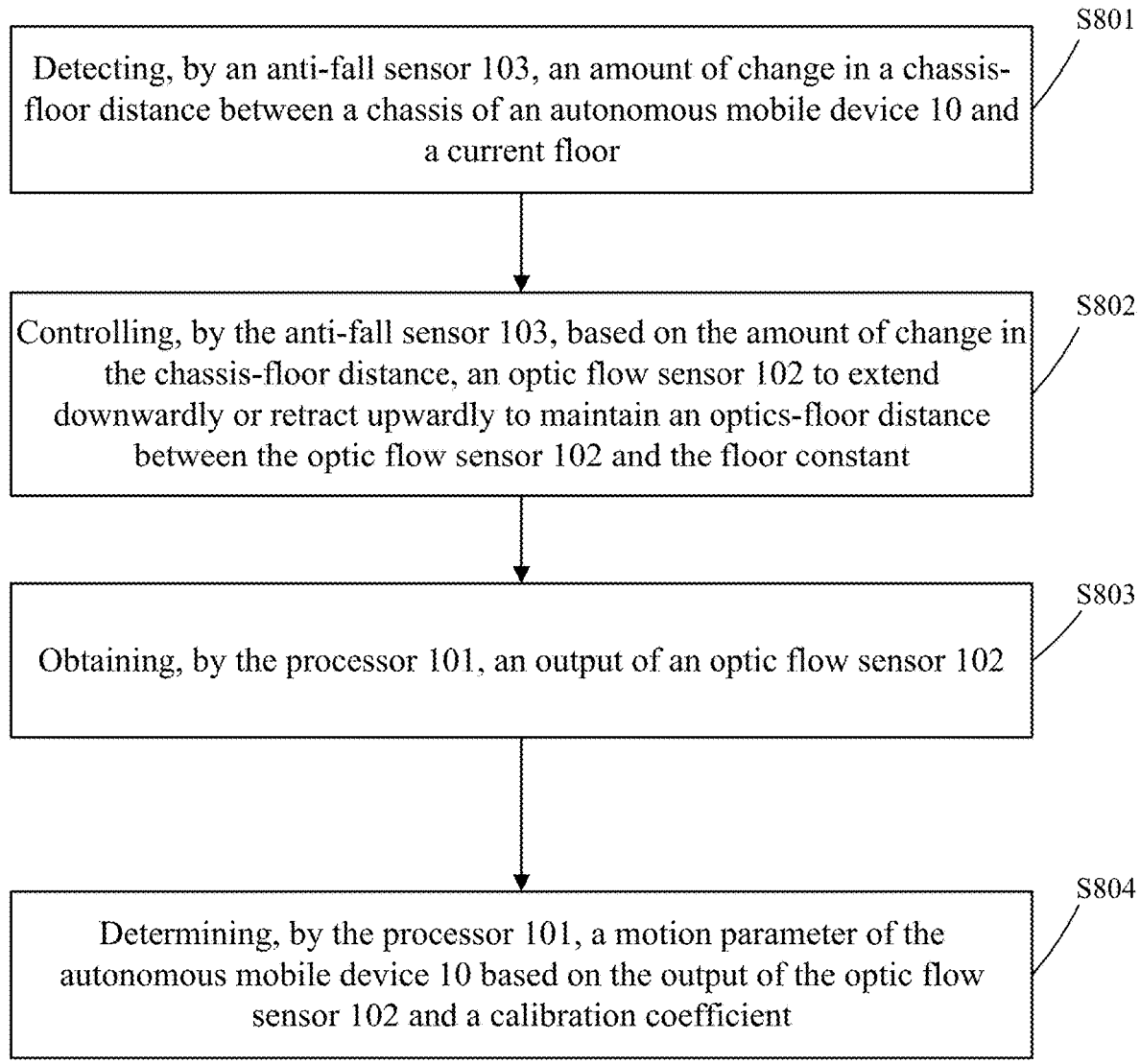
FIG. 8 is a schematic illustration of a flowchart showing a process of a second embodiment of the present disclosure.

For the second idea, the framework of the autonomous mobile device 10 as shown in FIG. 7 can be provided. FIG. 7 differs from FIG. 1 in that the optic flow sensor 102 and the anti-fall sensor 103 are connected. FIG. 8 is a schematic flowchart according to a second embodiment provided by the present disclosure. As shown in FIG. 8, the method for determining the motion parameter includes:

S801: detecting, by the anti-fall sensor 103, an amount of change in the chassis-floor distance between the chassis of the autonomous mobile device 10 and the floor.

Specifically, after the anti-fall sensor 103 detects the current chassis-floor distance between the chassis of the autonomous mobile device 10 and the floor, the anti-fall sensor 103 compares the current chassis-floor distance with a previously detected chassis-floor distance obtained in a preceding detection to obtain the amount of change in the chassis-floor distance. For example, the previously detected chassis-floor distance may be 70 mm, and the currently detected chassis-floor distance may be 50 mm. If negative is defined as becoming smaller, and positive is defined as becoming greater, then currently, the chassis-floor distance decreases from 70 mm to 50 mm, thus, the amount of change in the chassis-floor distance is −20 mm.

S802: controlling, by the anti-fall sensor 103, based on the amount of change in the chassis-floor distance, the optic flow sensor 102 to extend downwardly or retract upwardly to maintain an optics-floor distance between the optic flow sensor 102 and the floor constant.

This constant is a concept of substantially constant. When measuring errors are taken into account, it may be treated as being constant within a range of ±5 mm from an initial optics-floor distance. The initial optics-floor distance may be defined as: a distance between the optic flow sensor 102 and the floor, when the optic flow sensor 102 does not perform the extension-retraction movement, and when the chassis-floor distance is a calibrated chassis-floor distance.

Specifically, if the current chassis-floor distance increases as compared to the previously detected chassis-floor distance detected in the preceding detection, the anti-fall sensor 103 may transmit an extension instruction to the optic flow sensor 102. The extension instruction may carry the above-described amount of change. After the optic flow sensor 102 receives the extension instruction, it may extend for a predetermined distance. This predetermined distance may be the same as the amount of change. If the current chassis-floor distances decrease as compared to the previously detected chassis-floor distance detected in the preceding detection, the anti-fall sensor 103 may transmit a retraction instruction to the optic flow sensor 102. The retraction instruction may carry the above-described amount of change. After the optic flow sensor 102 receives the retraction instruction, it may retract for a predetermined distance. This predetermined distance may be the same as the amount of change.

In some embodiments, a distance sensor 116 may be disposed at a side of the optic flow sensor 102 to measure a distance between the optic flow sensor 102 and the floor, which may simultaneously and synchronously extend or retract with the optic flow sensor 102. When the optic flow sensor 102 completes the above-described extension or retraction operation, the distance sensor 116 may detect whether the optics-floor distance between the optic flow sensor 102 and the floor remains constant, and may provide the detection result to the optic flow sensor 102, the anti-fall sensor 103 or the processor 101, the latter of which (e.g., the processor 101) may control the optic flow sensor 102 to adjust the distance of extension or retraction, such that the optics-floor distance is the same as the previously calibrated chassis-floor distance or is within an error range (e.g., ±5 mm).

S803: obtaining, by the processor 101, the output of the optic flow sensor 102.

Similar to the above pertinent embodiments, the optic flow sensor 102 may periodically report the outputs to the processor 101, or may report the outputs to the processor 101 in real time. Alternatively, the processor 101 may transmit a report instruction to the optic flow sensor 102, after the optic flow sensor 102 receives the report instruction, it may report the outputs to the processor 101. The present disclosure does not limit this aspect.

S804: determining, by the processor 101, a motion parameter of the autonomous mobile device 10 based on the output of the optic flow sensor 102 and the calibration coefficient.

Specifically, because the optics-floor distance between the optic flow sensor 102 and the floor is constant, the output of the optic flow sensor 102 is accurate. The processor 101 may directly multiply the output of the optic flow sensor 102 and the calibration coefficient to obtain the motion parameter of the autonomous mobile device 10.

According to the method for determining the motion parameter provided by this embodiment, by detecting the amount of change in the chassis-floor distance between the chassis of the autonomous mobile device and the floor, the optic flow sensor may be controlled, based on the amount of change in the chassis-floor distance, to extend downwardly or retract upwardly, such that the optics-floor distance between the optic flow sensor and the floor remains constant. Because the optics-floor distance between the optic flow sensor and the floor is constant, the output of the optic flow sensor is already calibrated. The measured displacement obtained through computation based on the calibration coefficient is relatively constant with the actual displacement. The measured displacement obtained in this way is accurate, which makes the motion parameter obtained through computation based on the output of the optic flow sensor to be closer to the actual motion parameter.

The embodiments of the present disclosure also provide a method for determining a floor type for the autonomous mobile device. The autonomous mobile device involved in this method includes an anti-fall sensor, a motion device, and a processor.

Figure 9A:
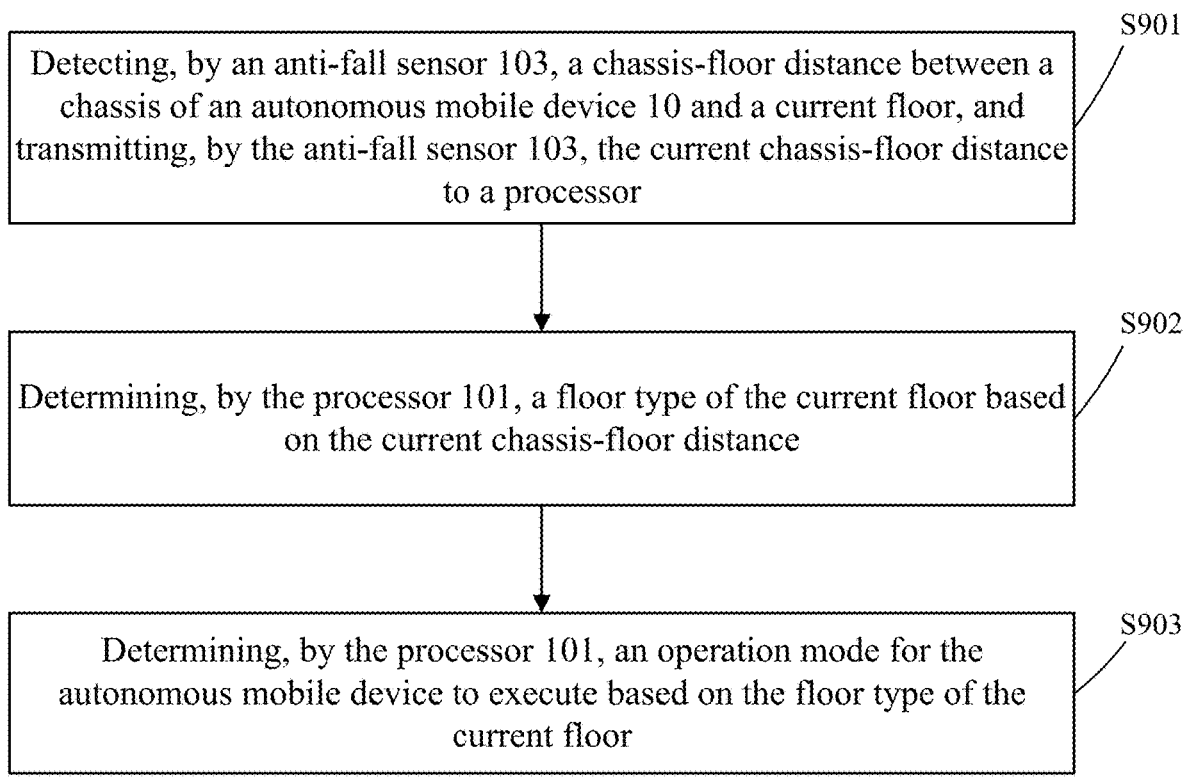
FIG. 9A is a schematic illustration of a flowchart showing a process of a third embodiment of the present disclosure.

The method for determining the floor type is shown in FIG. 9A, which specifically includes:

S901: detecting, by the anti-fall sensor 103, the current chassis-floor distance between the chassis of the autonomous mobile device 10 and the current floor, and transmitting, by the anti-fall sensor 103, the current chassis-floor distance to the processor.

This step S901 is similar to the step S501 in the above embodiment, which is not repeated.

S902: determining, by the processor 101, the floor type of the current floor based on the current chassis-floor distance.

Figure 9B:
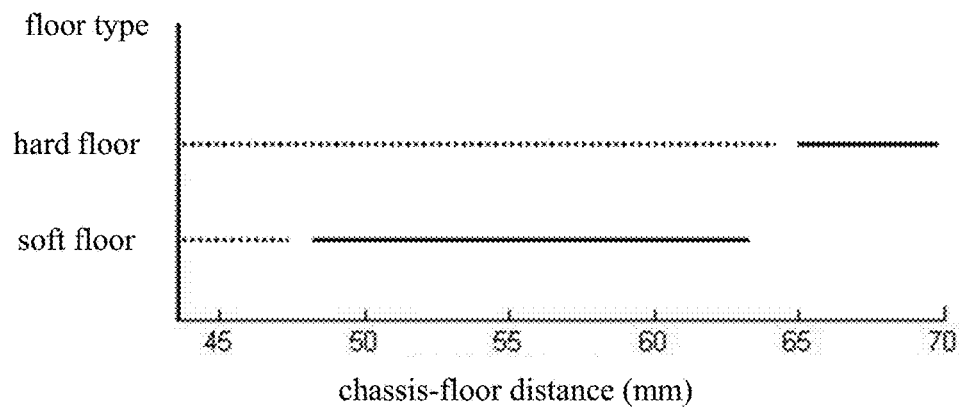
FIG. 9B is a schematic illustration of a distance-floor correspondence relationship according to an embodiment of the present disclosure.
Figure 9C:
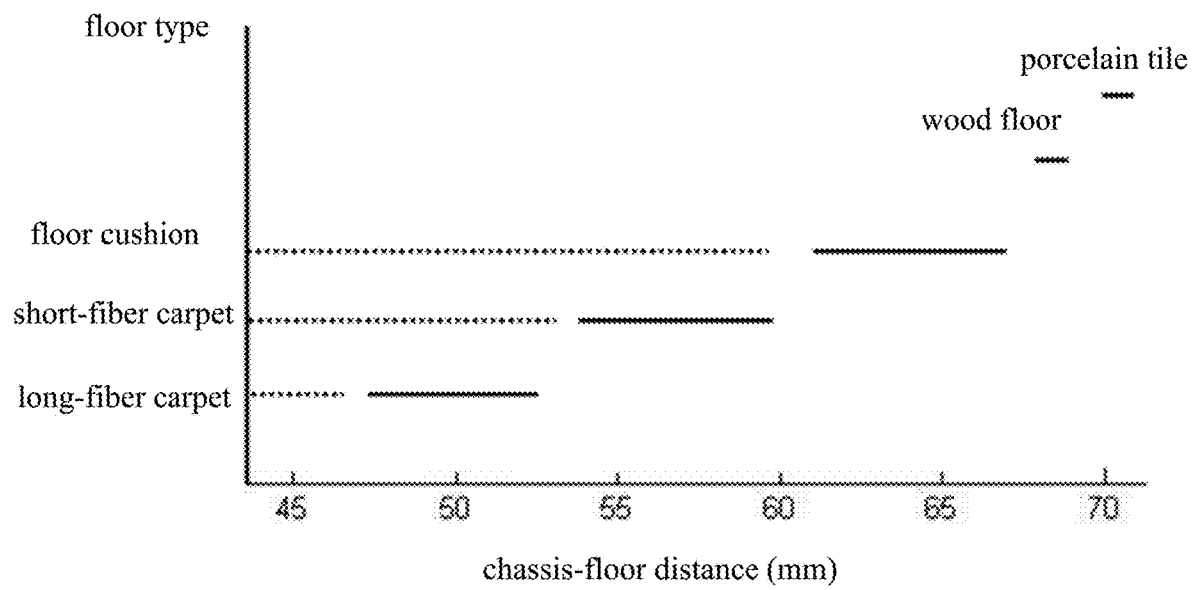
FIG. 9C is a schematic illustration of a distance-floor correspondence relationship according to an embodiment of the present disclosure.

The above-described floor type may be specific floor type, such as a wood floor, a porcelain tile, a carpet, etc., or may be types divided by the hardness of the floor, such as a hard floor, a soft floor, etc. The hard floor may include a floor formed by a material that is not easy to be compressed, such as wood floor, porcelain tile, granite, etc. The soft floor may include a floor formed by a material that can be compressed, such as a carpet, a floor cushion, etc., examples of which include long-fiber carpet, short-fiber carpet, yoga cushion, plastic cushion, etc. In some embodiments, the floor type includes at least one hard floor and at least one soft floor. The chassis-hard-floor distance between the chassis of the autonomous mobile device and the hard floor is greater than the chassis-soft-floor distance between the chassis of the autonomous mobile device and the soft floor. In some embodiments, the floor may be formed by multiple hard floors and/or multiple soft floors. The multiple hard floors may correspond to, for example, wood floor, porcelain tile, etc., respectively. The multiple soft floors may correspond to, for example, floor cushion, short-fiber carpet, long-fiber carpet, etc., respectively. Based on the different softness/hardness of the floor types, a distance-floor correspondence relationship may be established between the chassis-floor distances and the floor types. For example, FIG. 9B and FIG. 9C show, respectively, the distance-floor correspondence relationships between the chassis-floor distances and different floor types obtained based on different categorization methods. For example, as shown in FIG. 9B, the chassis-floor distance of 65 to 70 mm corresponds to a floor type of a hard floor, and the chassis-floor distance of 48 to 68 mm corresponds to a floor type of a soft floor. For example, in FIG. 9C, the chassis-floor distance of 68 to 69 mm corresponds to a floor type of a wood floor, the chassis-floor distance of 70 to 71 mm corresponds to a floor type of a porcelain floor, the chassis-floor distance of 47 to 53 mm corresponds to a floor type of a long-fiber carpet (according to different lengths of the carpet fibers, different types of long-fiber carpets may be further divided; but can also be divided into one category, collectively referred to as the long-fiber carpet), the chassis-floor distance of 54 to 60 mm corresponds to a floor type of short-fiber carpet (according to different lengths of the carpet fibers, different types of short-fiber carpets may be further divided; but can also be divided into one category, collectively referred to as the short-fiber carpet), the chassis-floor distance of 61 to 67 mm corresponds to a floor type of a floor cushion (according to different materials and purposes, may be further divided into different types, for example, plastic cushion, yoga cushion, soft cushion, etc.; but can also be divided into one category, collectively referred to as floor cushion). Based on the distance-floor correspondence relationship, the floor type of the current floor can be determined based on the current chassis-floor distance detected by the anti-fall sensor. It is noted that in FIG. 9B, FIG. 9C, the dotted lines are aligning lines.

S903: determining, by the processor, an operation mode for the autonomous mobile device to execute based on the floor type of the current floor.

When the processor obtains the floor type of the current floor, various usages can be implemented. For example, the floor type may be marked in the established map, or the operation mode for the autonomous mobile device to execute may be determined based on the floor type of the current floor. It is easy to understand that different floor types render different resistances and power consumptions for the operation of the autonomous mobile device. For example, a hard floor causes a low resistance and a low power consumption for the autonomous mobile device, whereas a soft floor such as a carpet causes a greater resistance and a greater power consumption for the autonomous mobile device. In addition, when the autonomous mobile device is a cleaning robot, when it moves on a hard floor such as a wood floor, porcelain tiles, etc., the cleaning robot can execute not only a sweeping mode but also a wet-mopping mode. But for a soft floor such as a carpet, a cushion, etc., the only suitable operation mode is the sweeping mode, and the wet-mopping operation mode is not suitable. Therefore, if the floor type is marked at a corresponding location in the map, the user and the autonomous mobile device know the floor conditions in each zone in the map, thereby enabling relatively accurate prediction of information such as power consumptions, operation modes, etc., in each zone in the map. This makes the autonomous mobile device more intelligent, and provides the user with more options. The processor of the autonomous mobile device can determine, based on the floor type of the current floor, different operation modes for the autonomous mobile device to execute, as shown in step S903 in FIG. 9A.

Illustratively, the operation modes can include: at least one hard floor mode and at least one soft floor mode. As described above, the operation mode can also include multiple hard floor modes and/or multiple soft floor modes, which is not repeated herein. In addition, the operation modes can be divided into different modes based on different purposes. If divided by cleaning methods, then the hard floor mode can correspond to the above-described cleaning mode and/or wet-mopping mode, and the soft floor mode can correspond to the above-described cleaning mode. Based on the above embodiments of the present disclosure, the floor type of the current floor is determined based on the current chassis-floor distance detected by the anti-fall sensor. The hard floor mode and the soft floor mode correspond to different correction coefficients. The motion parameter of the autonomous mobile device may be determined based on the correction coefficient determined based on the operation mode, in combination with the calibration coefficient, and the output of the optic flow sensor. The above embodiments have provided detailed descriptions, which are not repeated.

Illustratively, the above step 903 specifically refers to: when the floor type of the current floor is any one of the at least one hard floor, determining that the autonomous mobile device executes a corresponding hard floor mode, and when the floor type of the current floor is any one of the at least one soft floor, determining that the autonomous mobile device executes a corresponding soft floor monde.

In some embodiments, the present disclosure provides a method for determining a motion parameter of an autonomous mobile device. The method includes, for multiple to-be-detected chassis-floor distances, when an optic flow sensor of the autonomous mobile device moves at the multiple to-be-detected chassis-floor distances, obtaining, by a processor of the autonomous mobile device, actual motion parameters of the optic flow sensor and outputs of the optic flow sensor. The method also includes calculating, by the processor, a correspondence coefficient of a to-be-detected chassis-floor distance as, when the optic flow sensor moves at each to-be-detected chassis-floor distance, a ratio between an actual motion parameter of the optic flow sensor and an output of the optic flow sensor. The method also includes calculating a correction coefficient corresponding to the to-be-detected chassis-floor distance as a ratio between the correspondence coefficient of the to-be-detected chassis-floor distance and a calibration coefficient.

In some embodiments, the actual motion parameter is an actual displacement. Calculating the correspondence coefficient of the to-be-detected chassis-floor distance as, when the optic flow sensor moves at each to-be-detected chassis-floor distance, the ratio between the actual motion parameter of the optic flow sensor and the output of the optic flow sensor, includes: calculating the correspondence coefficient of the to-be-detected chassis-floor distance as, when the optic flow sensor moves at each to-be-detected chassis-floor distance, a ratio between the actual displacement of the optic flow sensor and the output of the optic flow sensor.

In some embodiments, the present disclosure provides a method for determining a motion parameter of an autonomous mobile device. The method includes detecting, by an anti-fall sensor of the autonomous mobile device, an amount of change in a chassis-floor distance between a chassis of the autonomous mobile device and a floor. The method also includes controlling, by the anti-fall sensor, based on the amount of change in the chassis-floor distance, an optic flow sensor of the autonomous mobile device to extend downwardly or retract upwardly, to maintain an optics-floor distance between the optic flow sensor and the floor constant. The method also includes obtaining, by a processor of the autonomous mobile device, an output of the optic flow sensor. The method also includes determining, by the processor, based on the output of the optic flow sensor and a calibration coefficient, the motion parameter of the autonomous mobile device, wherein the calibration coefficient is, when the autonomous mobile device moves at a calibrated chassis-floor distance, a correspondence relationship between the output of the optic flow sensor and an actual motion parameter. The motion parameter includes at least one of a displacement or a velocity.

In some embodiments, determining, by the processor, based on the output of the optic flow sensor and the calibration coefficient, the motion parameter of the autonomous mobile device, includes: multiplying, by the processor, the output of the optic flow sensor and the calibration coefficient to obtain the motion parameter of the autonomous mobile device.

In some embodiments, the present disclosure provides a method for determining a floor type for an autonomous mobile device. The method includes detecting, by an anti-fall sensor of the autonomous mobile device, a current chassis-floor distance between a chassis of the autonomous mobile device and a current floor, and transmitting the current chassis-floor distance to a processor of the autonomous mobile device. The method also includes determining, by the processor, the floor type of the current floor based on the current chassis-floor distance.

In some embodiments, the method includes determining, by the processor, an operation mode for the autonomous mobile device to execute based on the floor type of the current floor. The floor type includes at least one hard floor and at least one soft floor. A chassis-hard-floor distance between the chassis of the autonomous mobile device and a hard floor is greater than a chassis-soft-floor distance between the chassis of the autonomous mobile device and a soft floor. The operation mode includes: at least one hard floor mode and at least one soft floor mode. In some embodiments, determining, by the processor, the operation mode for the autonomous mobile device to execute based on the floor type of the current floor, includes: when the floor type of the current floor is any one of the at least one hard floor, determining that the autonomous mobile device executes a corresponding hard floor mode, and when the floor type of the current floor is any one of the at least one soft floor, determining that the autonomous mobile device executes a corresponding soft floor mode.

In some embodiments, the present disclosure provides an autonomous mobile device. The autonomous mobile device includes an optic flow sensor, an anti-fall sensor, a motion device, and a processor. The optic flow sensor, the anti-fall sensor, and the motion device are connected with the processor, respectively. The anti-fall sensor is configured to detect a current chassis-floor distance between a chassis of the autonomous mobile device and a current floor. The processor is configured to determine a correction coefficient corresponding to the current chassis-floor distance, obtain an output of the optic flow sensor, and determine a motion parameter corresponding to the current chassis-floor distance based on a correction coefficient, a calibration coefficient, and the output of the optic flow sensor.

In some embodiments, the present disclosure provides an autonomous mobile device. The autonomous mobile device includes an optic flow sensor, an anti-fall sensor, a motion device, and a processor. The optic flow sensor, the anti-fall sensor, and the motion device are connected with the processor, respectively, and the optic flow sensor and the anti-fall sensor are connected. The anti-fall sensor is configured to detect an amount of change in a chassis-floor distance between a chassis of the autonomous mobile device and a floor, and control, based on the amount of change in the chassis-floor distance, the optic flow sensor to extend downwardly or retract upwardly to maintain an optics-floor distance between the optic flow sensor and the floor constant. The processor is configured to obtain an output of the optic flow sensor, and determine a motion parameter of the autonomous mobile device based on the output of the optic flow sensor and a calibration coefficient. The calibration coefficient is, when the autonomous mobile device moves at a calibrated chassis-floor distance, a correspondence relationship between the output of the optic flow sensor and an actual motion parameter. The motion parameter includes at least one of a displacement or a velocity.

In some embodiments, the present disclosure provides an autonomous mobile device. The autonomous mobile device includes an anti-fall sensor, a motion device, and a processor. The anti-fall sensor and the motion device are connected with the processor, respectively. The anti-fall sensor is configured to detect a current chassis-floor distance between a chassis of the autonomous mobile device and a current floor. The processor is configured to determine a floor type of the current floor based on the current chassis-floor distance.

It should be understood, that the processor described in the present disclosure can be a Central Processing Unit (CPU), or can be other general processor, a Digital Signal Processor (DSP), an Application Specific Integrated Circuit (ASIC), etc. The general processor may be a microprocessor or the processor may be any regular processor, etc. The steps of the methods disclosed in the present disclosure may be directly executed and accomplished by a hardware processor, or may be executed and accomplished by a combination of hardware and software modules in the processor.

Finally, it is noted that: the above embodiments are only used to explain the technical solutions of the present disclosure, and are not intended to limit the present disclosure. Although the present disclosure is explained in detail with reference to the above-described embodiments, a person having ordinary skills in the art can appreciate: the technical solutions described in the above-described embodiments can bd modified, or some or all of the technical features may be replaced with equivalents. Such modifications and replacements do not make the corresponding technical solutions fall out of the scope of the technical solutions of the embodiments of the present disclosure.

What is claimed is:

1. A method for determining a motion parameter of an autonomous mobile device, comprising:
    detecting, by an anti-fall sensor of the autonomous mobile device, a current chassis-floor distance between a chassis of the autonomous mobile device and a current floor, and transmitting the current chassis-floor distance to a processor of the autonomous mobile device;
    determining, by the processor, a correction coefficient corresponding to the current chassis-floor distance;
    obtaining, by the processor, an output of an optic flow sensor of the autonomous mobile device; and
    determining, by the processor, the motion parameter based on multiplying the correction coefficient, a calibration coefficient, and the output of the optic flow sensor to obtain the motion parameter corresponding to the current chassis-floor distance,
    wherein the calibration coefficient is, when the autonomous mobile device moves at a calibrated chassis-floor distance, a correspondence relationship between the output of the optic flow sensor and an actual motion parameter,
    wherein the correction coefficient is used to correct the calibration coefficient, when the current chassis-floor distance is different from the calibrated chassis-floor distance, to obtain the motion parameter corresponding to the current chassis-floor distance, and
    wherein the motion parameter includes at least one of a displacement or a velocity.

2. The method of claim 1,
    wherein the actual motion parameter is an actual displacement,
    wherein the calibration coefficient is obtained through the following steps:
        obtaining, by the processor, when the autonomous mobile device moves at the calibrated chassis-floor distance, the actual displacement of the autonomous mobile device and the output of the optic flow sensor, wherein the actual displacement is a displacement actually measured through a length measuring tool; and
        calculating, by the processor, the calibration coefficient as a ratio between the actual displacement and the output of the optic flow sensor.

3. The method of claim 1, wherein determining, by the processor, the correction coefficient corresponding to the current chassis-floor distance, comprises:
    obtaining, by the processor, the correction coefficient through inquiring a pre-stored mapping relationship or through computation, wherein the mapping relationship is a correspondence relationship between multiple to-be-detected chassis-floor distances and correction coefficients,
    wherein the mapping relationship is obtained through the following steps:
        for the multiple to-be-detected chassis-floor distances, when the optic flow sensor moves at the multiple to-be-detected chassis-floor distances, obtaining, by the processor, actual displacements of the optic flow sensor and outputs of the optic flow sensor;
        calculating, by the processor, a correspondence coefficient of a to-be-detected chassis-floor distance as, when the optic flow sensor moves at each to-be-detected chassis-floor distance, a ratio between an actual displacement of the optic flow sensor and an output of the optic flow sensor; and
        calculating, by the processor, the correction coefficient corresponding to the to-be-detected chassis-floor distance as a ratio between the correspondence coefficient of the to-be-detected chassis-floor distance and the calibration coefficient, and forming, by the processor, the mapping relationship based on the multiple to-be-detected chassis-floor distances and the corresponding correction coefficients.

4. The method of claim 1, wherein prior to determining, by the processor, the correction coefficient corresponding to the current chassis-floor distance, the method further comprises:
    determining, by the processor, whether a changing frequency of the chassis-floor distance within a predetermined time period exceeds a predetermined value; and
    when the predetermined value is exceeded, executing, by the processor, an alarming process.

5. An autonomous mobile device, comprising:
    an optic flow sensor;
    a processor; and
    an anti-fall sensor that detects a current chassis-floor distance between a chassis of the autonomous mobile device and a current floor on which the autonomous mobile device is disposed, and transmits the current chassis-floor distance to the processor;
    wherein the processor is configured to:
        determine a correction coefficient corresponding to the current chassis-floor distance;
        obtain an output of the optic flow sensor; and
        determine a motion parameter corresponding to the current chassis-floor distance based on the correction coefficient, a calibration coefficient, and the output of the optic flow sensor, wherein the calibration coefficient is, when the autonomous mobile device moves at a calibrated chassis-floor distance, a correspondence relationship between the output of the optic flow sensor and an actual motion parameter, wherein the processor determines the motion parameter based on multiplying the correction coefficient, the calibration coefficient, and the output of the optic flow sensor to obtain the motion parameter corresponding to the current chassis-floor distance, wherein the processor corrects the calibration coefficient using the correction coefficient, when the current chassis-floor distance is different from the calibrated chassis-floor distance, to obtain the motion parameter corresponding to the current chassis-floor distance, and wherein the motion parameter includes at least one of a displacement or a velocity.

6. The autonomous mobile device of claim 5, wherein the actual motion parameter is an actual displacement, and wherein the processor obtains the calibration coefficient by:

obtaining, when the autonomous mobile device moves at the calibrated chassis-floor distance, the actual displacement of the autonomous mobile device and the output of the optic flow sensor, wherein the actual displacement is a displacement actually measured through a length measuring tool; and calculating the calibration coefficient as a ratio between the actual displacement and the output of the optic flow sensor.

7. The autonomous mobile device of claim 5, wherein when the processor determines the correction coefficient corresponding to the current chassis-floor distance, the processor obtains the correction coefficient through inquiring a pre-stored mapping relationship or through computation, wherein the mapping relationship is a correspondence relationship between multiple to-be-detected chassis-floor distances and correction coefficients, wherein the processor obtains the mapping relationship through the following steps:

for the multiple to-be-detected chassis-floor distances, when the optic flow sensor moves at the multiple to-be-detected chassis-floor distances, obtaining, by the processor, actual displacements of the optic flow sensor and outputs of the optic flow sensor;

calculating, by the processor, a correspondence coefficient of a to-be-detected chassis-floor distance as, when the optic flow sensor moves at each to-be-detected chassis-floor distance, a ratio between an actual displacement of the optic flow sensor and an output of the optic flow sensor; and calculating, by the processor, the correction coefficient corresponding to the to-be-detected chassis-floor distance as a ratio between the correspondence coefficient of the to-be-detected chassis-floor distance and the calibration coefficient, and forming, by the processor, the mapping relationship based on the multiple to-be-detected chassis-floor distances and the corresponding correction coefficients.

8. The autonomous mobile device of claim 5, wherein the processor is configured to:

prior to determining the correction coefficient corresponding to the current chassis-floor distance:

determine whether a changing frequency of the chassis-floor distance within a predetermined time period exceeds a predetermined value; and when the predetermined value is exceeded, execute an alarming process.

9. A non-transitory computer-readable storage medium storing computer-executable instructions, which when executed by a processor of an autonomous mobile device, cause the autonomous mobile device to perform a method comprising:

detecting, by an anti-fall sensor of the autonomous mobile device, a current chassis-floor distance between a chassis of the autonomous mobile device and a current floor, and transmitting the current chassis-floor distance to the processor;

determining, by the processor, a correction coefficient corresponding to the current chassis-floor distance;

obtaining, by the processor, an output of an optic flow sensor of the autonomous mobile device; and determining, by the processor, the motion parameter based on multiplying the correction coefficient, a calibration coefficient, and the output of the optic flow sensor to obtain the motion parameter corresponding to the current chassis-floor distance;

wherein the calibration coefficient is, when the autonomous mobile device moves at a calibrated chassis-floor distance, a correspondence relationship between the output of the optic flow sensor and an actual motion parameter, wherein the correction coefficient is used to correct the calibration coefficient, when the current chassis-floor distance is different from the calibrated chassis-floor distance, to obtain the motion parameter corresponding to the current chassis-floor distance, and wherein the motion parameter includes at least one of a displacement or a velocity.

10. The non-transitory computer-readable storage medium of claim 9, wherein the actual motion parameter is an actual displacement, and wherein the calibration coefficient is obtained through the following steps:

obtaining, by the processor, when the autonomous mobile device moves at the calibrated chassis-floor distance, the actual displacement of the autonomous mobile device and the output of the optic flow sensor, wherein the actual displacement is a displacement actually measured through a length measuring tool; and calculating, by the processor, the calibration coefficient as a ratio between the actual displacement and the output of the optic flow sensor.

11. The non-transitory computer-readable storage medium of claim 9, wherein determining, by the processor, the correction coefficient corresponding to the current chassis-floor distance, comprises:

obtaining, by the processor, the correction coefficient through inquiring a pre-stored mapping relationship or through computation, wherein the mapping relationship is a correspondence relationship between multiple to-be-detected chassis-floor distances and correction coefficients, wherein the mapping relationship is obtained through the following steps:

for the multiple to-be-detected chassis-floor distances, when the optic flow sensor moves at the multiple to-be-detected chassis-floor distances, obtaining, by the processor, actual displacements of the optic flow sensor and outputs of the optic flow sensor;

calculating, by the processor, a correspondence coefficient of a to-be-detected chassis-floor distance as, when the optic flow sensor moves at each to-be-detected chassis-floor distance, a ratio between an actual displacement of the optic flow sensor and an output of the optic flow sensor; and calculating, by the processor, the correction coefficient corresponding to the to-be-detected chassis-floor distance as a ratio between the correspondence coefficient of the to-be-detected chassis-floor distance and the calibration coefficient, and forming, by the processor, the mapping relationship based on the multiple to-be-detected chassis-floor distances and the corresponding correction coefficients.

12. The non-transitory computer-readable storage medium of claim 9, wherein prior to determining, by the processor, the correction coefficient corresponding to the current chassis-floor distance, the method further comprises:

determining, by the processor, whether a changing frequency of the chassis-floor distance within a predetermined time period exceeds a predetermined value; and when the predetermined value is exceeded, executing, by the processor, an alarming process.

* * * * *